US011356586B2

(12) United States Patent
Cutler

(10) Patent No.: US 11,356,586 B2
(45) Date of Patent: Jun. 7, 2022

(54) PANORAMIC CAMERA SYSTEM

(71) Applicant: MICROSOFT TECHNOLOGY LICENSING, LLC, Redmond, WA (US)

(72) Inventor: Ross Garrett Cutler, Clyde Hill, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/515,009

(22) Filed: Jul. 17, 2019

(65) Prior Publication Data

US 2020/0296268 A1    Sep. 17, 2020

Related U.S. Application Data

(60) Provisional application No. 62/822,288, filed on Mar. 22, 2019, provisional application No. 62/819,589, filed on Mar. 16, 2019.

(51) Int. Cl.
*H04N 5/225* (2006.01)
*H04N 5/232* (2006.01)

(52) U.S. Cl.
CPC ......... *H04N 5/2258* (2013.01); *H04N 5/2254* (2013.01); *H04N 5/2257* (2013.01); *H04N 5/23238* (2013.01)

(58) Field of Classification Search
CPC .. H04N 5/2258; H04N 5/2254; H04N 5/2257; H04N 5/23238
See application file for complete search history.

(56) References Cited

U.S. PATENT DOCUMENTS 5,757,004 A    5/1998 Sandell et al.
6,310,731 B1 * 10/2001 Wartmann ............. G02B 13/08
                                                     359/649
(Continued)

FOREIGN PATENT DOCUMENTS

WO    2018167581 A1    9/2018

OTHER PUBLICATIONS

"Microsoft Build: Modern Meetings Demo", Retrieved from: https://www.youtube.com/watch?v=ddb3ZgAp9TA, May 8, 2018, 1 Page.
(Continued)

*Primary Examiner* — Maria E Vazquez Colon
(74) *Attorney, Agent, or Firm* — NovoTechIP International PLLC

(57) ABSTRACT

A camera system including a first imaging sensor having a first imaging surface with a first diagonal length, a first lens arranged to guide a first image formation light flux toward the first imaging surface with the first image formation light flux having at the first imaging surface a width equal to or greater than the first diagonal length, a second imaging sensor having a second imaging surface with a second diagonal length, a second lens arranged to guide a second image formation light flux toward the second imaging surface with the second image formation light flux having at the second imaging surface a width equal to or greater than the second diagonal length. The first lens and the second lens are oriented in opposing directions, and the first imaging sensor, the first lens, the second imaging sensor, and the second lens are each mounted partially within an enclosure.

20 Claims, 18 Drawing Sheets

(56) References Cited

U.S. PATENT DOCUMENTS

| | | | |
|---|---|---|---|
| 7,495,694 B2 | 2/2009 | Cutler et al. | |
| 9,992,412 B1 | 6/2018 | Tyagi | |
| 10,151,905 B2 | 12/2018 | Satoh et al. | |
| 10,440,294 B1* | 10/2019 | Wan | H04N 7/18 |
| 2005/0041300 A1* | 2/2005 | Oshima | G03B 17/14 |
| | | | 359/642 |
| 2005/0117034 A1 | 6/2005 | Cutler et al. | |
| 2009/0002477 A1* | 1/2009 | Cutler | H04N 5/23258 |
| | | | 348/14.1 |
| 2010/0245539 A1 | 9/2010 | Lin | |
| 2011/0128417 A1* | 6/2011 | Shioji | H04N 5/23245 |
| | | | 348/240.3 |
| 2013/0229570 A1 | 9/2013 | Beck et al. | |
| 2015/0215500 A1* | 7/2015 | He | H04N 5/232 |
| | | | 348/158 |
| 2016/0088287 A1* | 3/2016 | Sadi | H04N 13/261 |
| | | | 348/43 |
| 2016/0154198 A1 | 6/2016 | Alasimio et al. | |
| 2017/0315336 A1 | 11/2017 | Masuda et al. | |
| 2018/0367719 A1* | 12/2018 | Wang | G06T 7/001 |
| 2019/0394367 A1* | 12/2019 | Tada | H04N 5/2258 |

OTHER PUBLICATIONS

Maldow, Davids., "Polycom Reinvents the Microsoft RoundTable 360 Degree Videoconferencing Camera—Telepresence Options", Retrieved From: http://www.telepresenceoptions.com/2013/07/polycom_reinvents_the_microsof/, Jul. 9, 2013, 3 Pages.

"International Search Report and Written Opinion Issued in PCT Application No. PCT/US2020/021618", dated May 25, 2020, 18 Pages.

Thibault, et al., "Design, Fabrication and Test of Miniature Plastic Panomorph Lenses with 180° Field of View", In Proceedings of International Optical Design Conference, Jun. 22, 2014, 10 Pages.

* cited by examiner

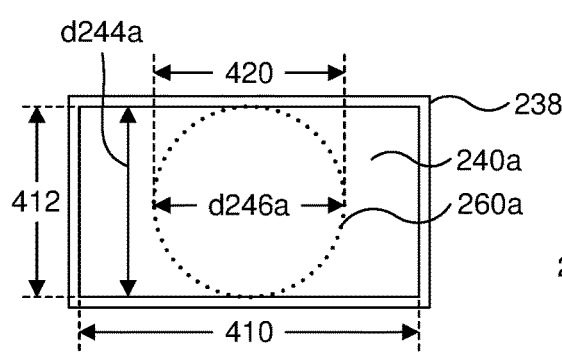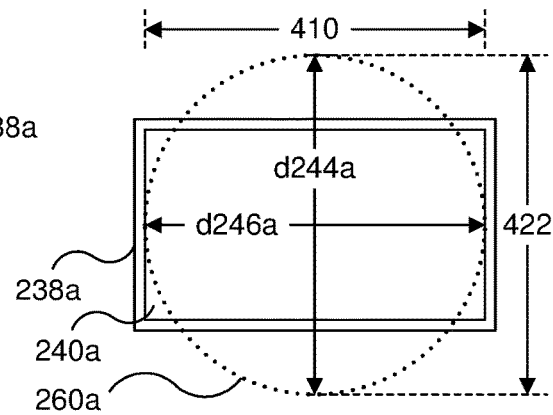
FIG. 4A  FIG. 4B
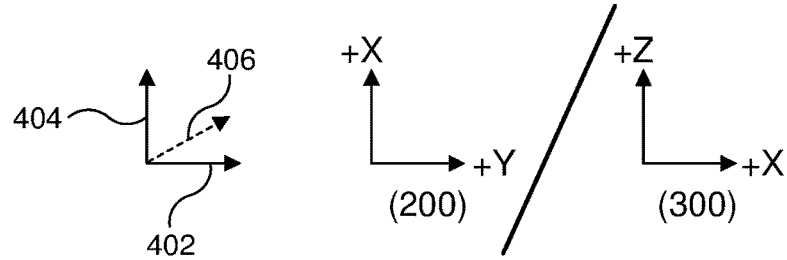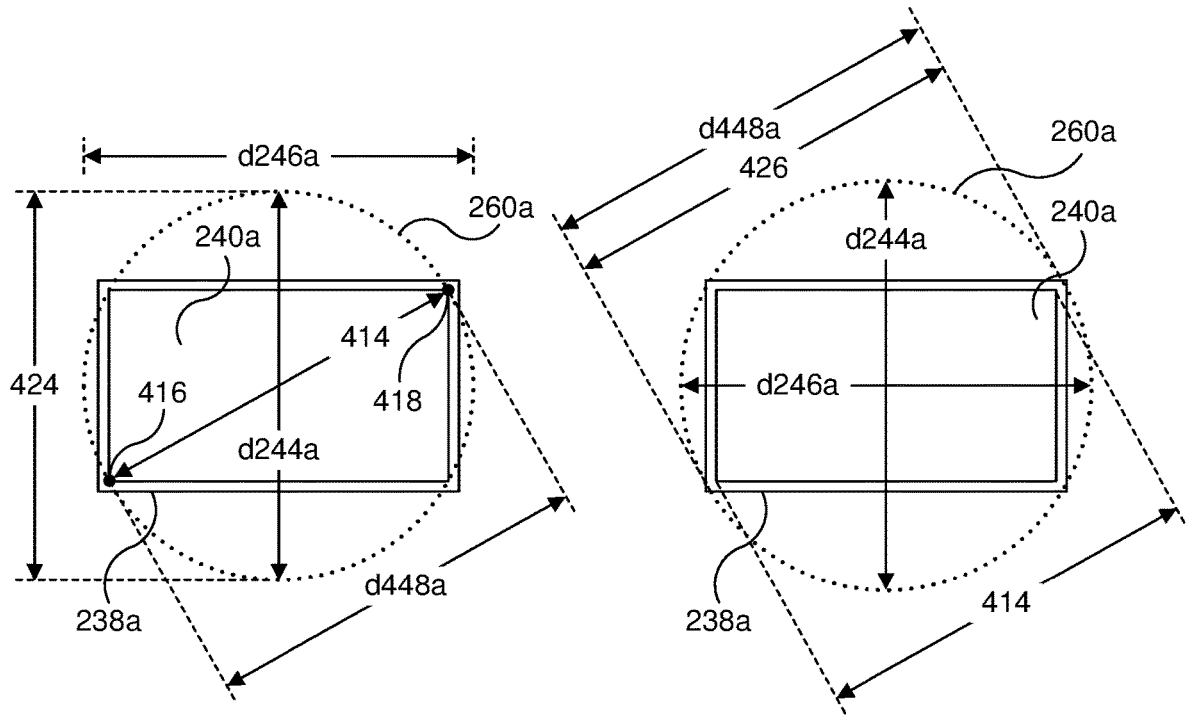
FIG. 4C  FIG. 4D

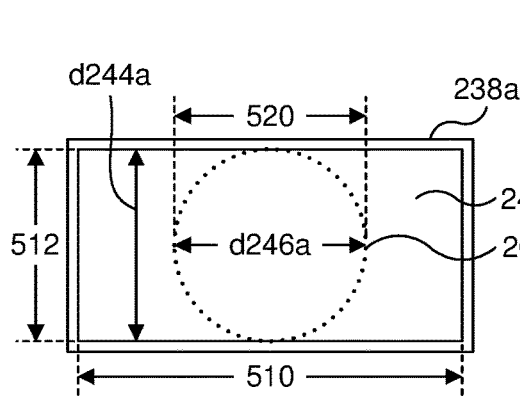
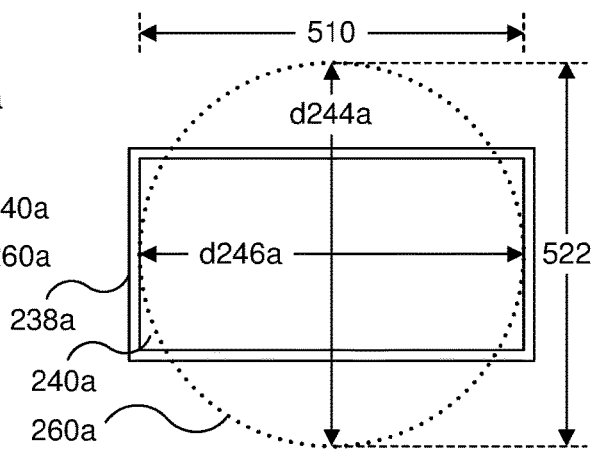
FIG. 5A  FIG. 5B
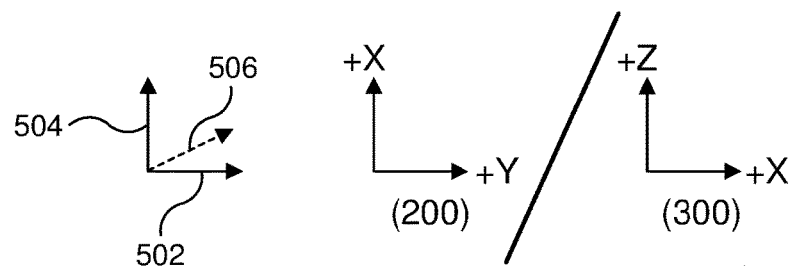
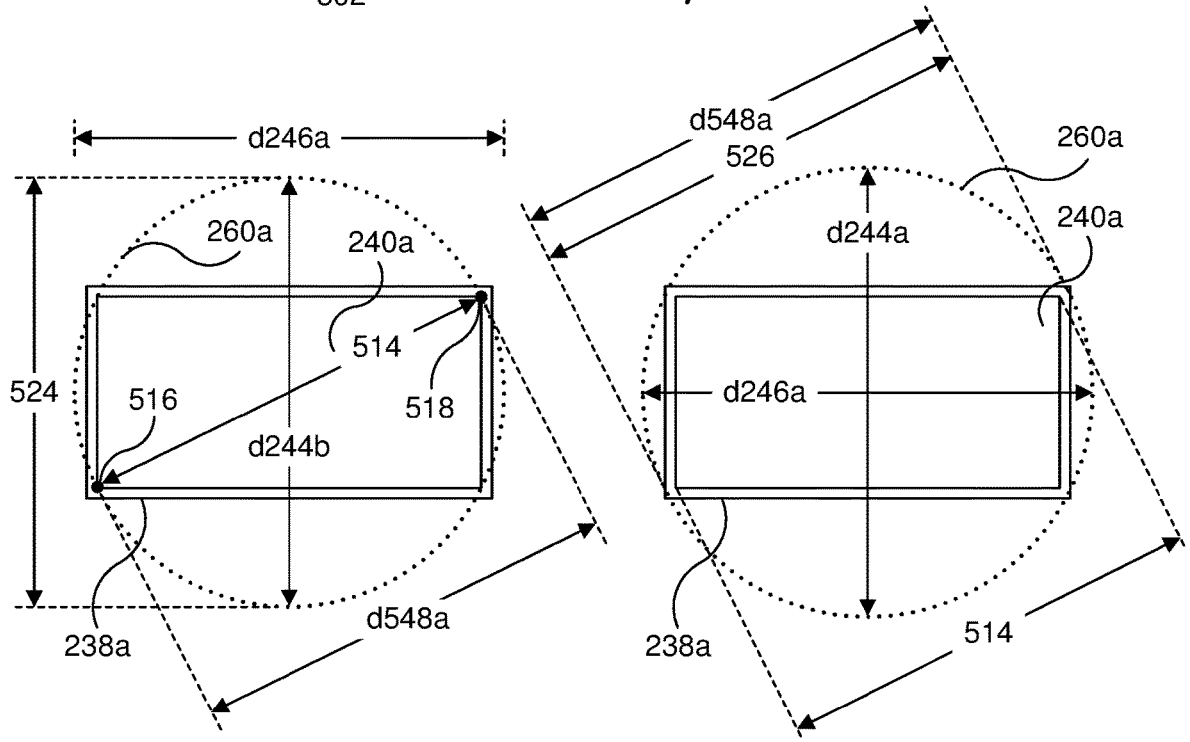
FIG. 5C  FIG. 5D

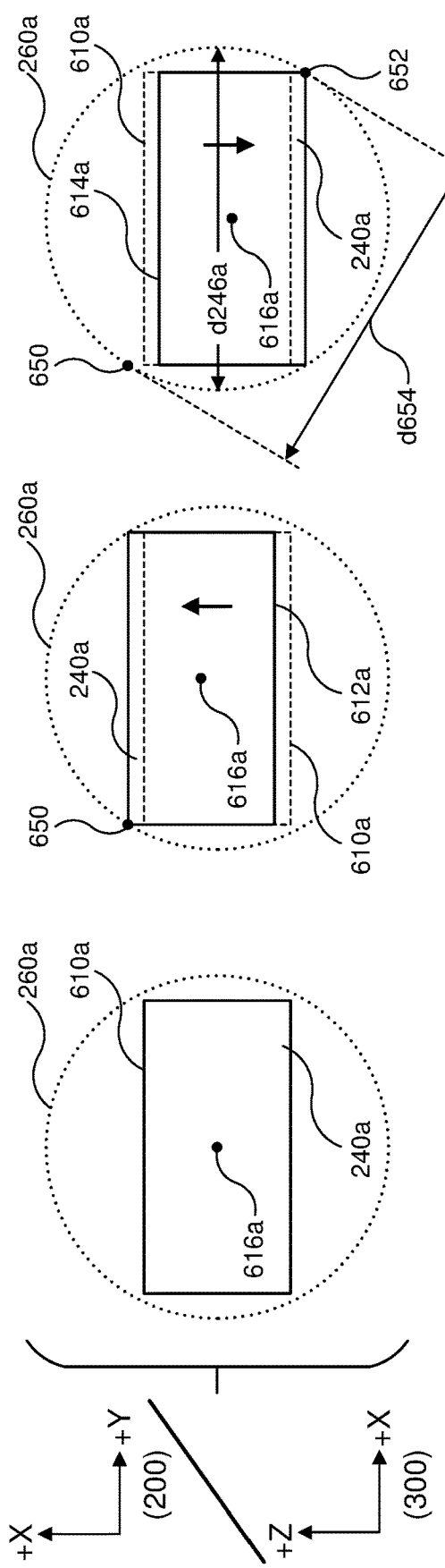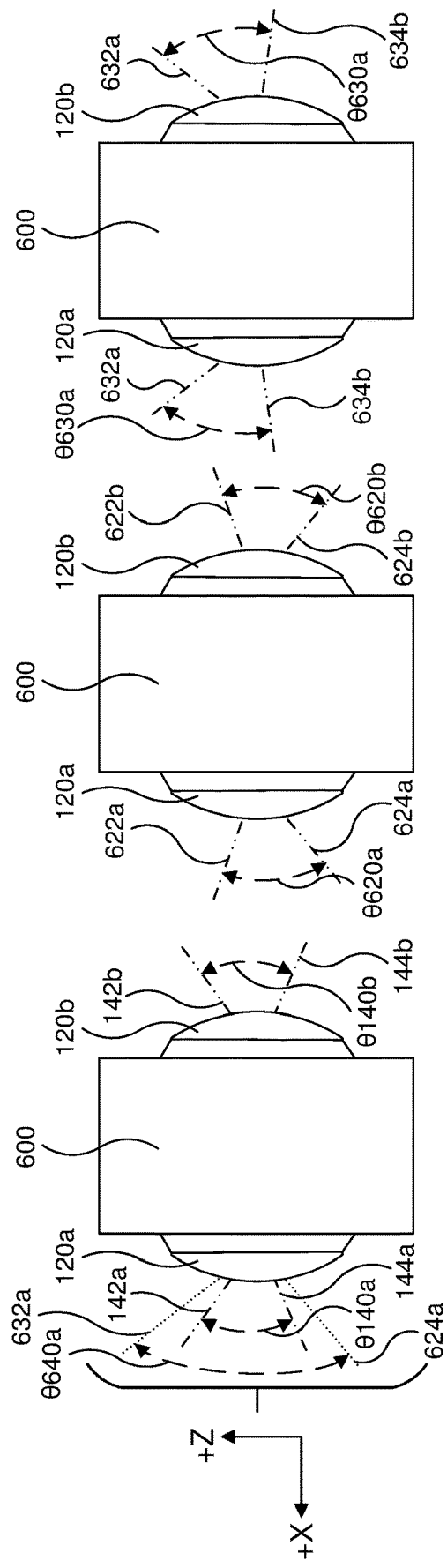

PANORAMIC CAMERA SYSTEM

CROSS-REFERENCE TO RELATED APPLICATIONS

This application claims the benefit of priority from U.S. Provisional Patent Application Ser. No. 62/819,589 (filed on Mar. 16, 2019 and entitled "Two-Camera 360-Degree Camera for Conference Rooms") and 62/822,288 (filed on Mar. 22, 2019 and entitled "Two-Camera 360-Degree Camera for Conference Rooms"), each of which are incorporated by reference herein in their entireties.

BACKGROUND 360-degree cameras such as Microsoft RoundTable™ and the Polycom CX5500 Unified Conference Station have been shown to be practical commercial solutions for capturing video for teleconferencing scenarios. Since their initial release, new and/or more advanced teleconferencing capabilities, such as person identification, active speaker identification and high accuracy video-assisted speech recognition, have been developed using video processing techniques. However, the single camera solutions often used to capture video effective for those video processing techniques have an insufficient vertical field of view (VFOV) in various common real-world teleconferencing environments and scenarios (as observed with single sensor wide angle fisheye lens designs), such as when a human participant is seated at a low height or is standing, and/or have too limited of a depth of field (as observed with catadioptric designs). Although a suitable VFOV is provided by the Microsoft RoundTable™ and the Polycom CX5500 Unified Conference Station, the cost of these 360-degree cameras impedes their adoption and, as a result users are unable take full advantage of the above teleconferencing capabilities.

SUMMARY

A camera system, in accordance with a first aspect of this disclosure, includes an enclosure, a first imaging sensor having a first imaging surface with a first diagonal length in a first direction between two opposing corners of the first imaging surface, and a first lens arranged to guide a first image formation light flux toward the first imaging surface with the first image formation light flux having at the first imaging surface a first width in the first direction that is equal to or greater than the first diagonal length of the first imaging sensor. The camera system further includes a second imaging sensor, different than the first imaging sensor, having a second imaging surface with a second diagonal length in a second direction between two opposing corners of the second imaging surface, and a second lens arranged to guide a second image formation light flux toward the second imaging surface with the second image formation light flux having at the second imaging surface a second width in the second direction that is equal to or greater than the second diagonal length of the second imaging sensor. Additionally, the first imaging sensor, the first lens, the second imaging sensor, and the second lens are each mounted at least partially within the enclosure, and the first lens and the second lens are oriented in opposing directions.

A method of obtaining a 360-degree composite image frame, in accordance with a first aspect of this disclosure, the method including receiving first image data for a first image frame captured by a first imaging sensor having a first imaging surface with a first diagonal length in a first direction between two opposing corners of the first imaging surface, wherein a first lens is arranged to guide a first image formation light flux toward the first imaging surface with the first image formation light flux having at the first imaging surface a first width in the first direction that is equal to or greater than the first diagonal length of the first imaging sensor. The method further includes receiving second image data for a second image frame captured by a second imaging sensor, different than the first imaging sensor, having a second imaging surface with a second diagonal length in a second direction between two opposing corners of the second imaging surface, wherein a second lens is arranged to guide a second image formation light flux toward the second imaging surface with the second image formation light flux having at the second imaging surface a second width in the second direction that is equal to or greater than the second diagonal length of the second imaging sensor. Additionally, the method includes generating the 360-degree composite image frame based on the first image data for the first image frame and the second image data for the second image frame. Also, the first imaging sensor, the first lens, the second imaging sensor, and the second lens are each mounted at least partially within an enclosure, the first lens and the second lens are oriented in opposing directions, and the 360-degree composite image frame has a 360 degree horizontal field of view.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

BRIEF DESCRIPTION OF THE DRAWINGS

The drawing figures depict one or more implementations in accord with the present teachings, by way of example only, not by way of limitation. In the figures, like reference numerals refer to the same or similar elements. Furthermore, it should be understood that the drawings are not necessarily to scale.

FIG. 1A shows a front top isometric view of the first panoramic camera. FIG. 1B shows a front rear isometric view of the first panoramic camera. FIG. 1C shows a right side view of the first panoramic camera. FIG. 1D shows a top plan view of the first panoramic camera.

FIG. 1E shows a front top isometric view of the integrated camera system. FIG. 1F shows a top plan view of the integrated camera system.

FIGS. 4A-4D illustrate various configurations for the image circle shown in FIG. 2A or FIG. 2B for the second panoramic camera and in FIG. 3A or FIG. 3B for the third panoramic camera in relation to the first image sensor, in which the first image sensor has an aspect ratio of 16:9.

FIGS. 5A-5D illustrate various configurations for the image circle shown in FIG. 2A or FIG. 2B for the second panoramic camera and in FIG. 3A or FIG. 3B for the third panoramic camera in relation to the first image sensor, in which the first image sensor has an aspect ratio of 2:1.

FIGS. 6A-6F show examples in which the second panoramic camera shown in FIG. 2A or FIG. 2B and/or the third panoramic camera shown in FIG. 3A or FIG. 3B is/are configured to mechanically shift the first image sensor to effect corresponding shifts in VFOV obtained by the first image sensor. In FIGS. 6A and 6B, the first image sensor is in a first sensor corresponding to the position of the first image sensor in FIGS. 1C, 2A, 2B, 3A, 3B, 4D, and 5D. In FIGS. 6C and 6D, the first image sensor has been shifted in a positive lateral to a second sensor position, resulting in a downward VFOV shift. In FIGS. 6E and 6F, the first image sensor has been shifted in a negative lateral direction to a third sensor position, resulting in a downward VFOV shift.

In FIG. 7A, the first image sensor and the second image sensor have been shifted together in the positive lateral direction as shown in FIGS. 6C and 6D. In FIG. 7B, the first image sensor and the second image sensor have been shifted together in the negative lateral direction as shown in FIGS. 6E and 6F.

In FIG. 8A, the first image sensor and the second image sensor have been shifted together in the positive lateral direction as shown in FIGS. 6C and 6D. In FIG. 8B, the first image sensor and the second image sensor have been shifted together in the negative lateral direction as shown in FIGS. 6E and 6F.

DETAILED DESCRIPTION

Figure 1D:
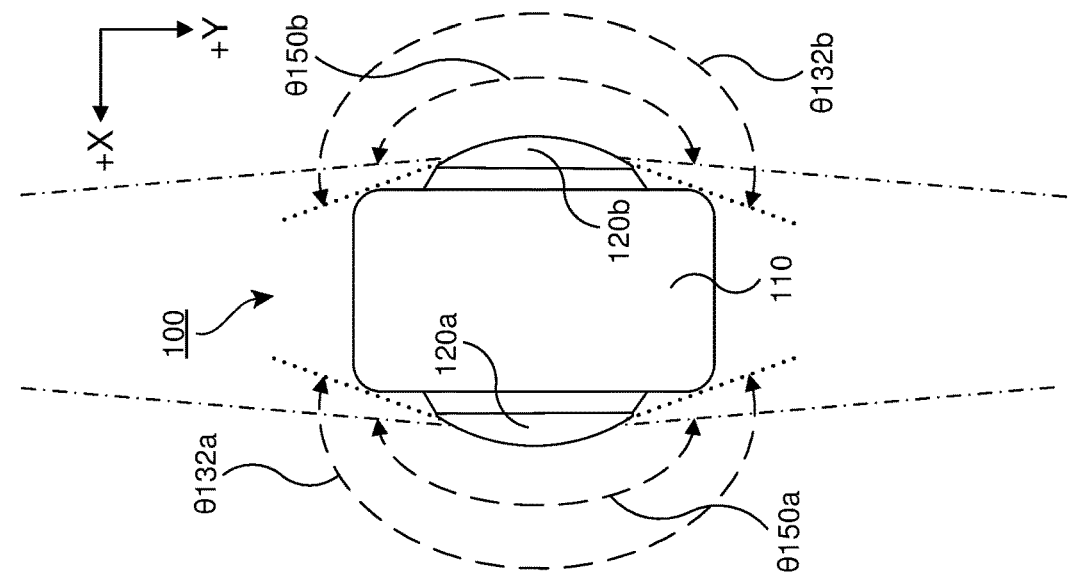
FIGS. 1A-1D illustrate an example implementation of a first panoramic camera configured to use two image sensors and respective lenses to produce 360-degree image.

In the following detailed description, numerous specific details are set forth by way of examples in order to provide a thorough understanding of the relevant teachings. However, it should be apparent that the present teachings may be practiced without such details. In other instances, well known methods, procedures, components, and/or circuitry have been described at a relatively high-level, without detail, in order to avoid unnecessarily obscuring aspects of the present teachings.

There are various known options for 360-degree cameras suitable for teleconferencing use, but each has associated shortcomings. For some designs, a single sensor fisheye lens has been used. Although this is a simple and low-cost design approach, it fails to deliver a suitable vertical field of view (VFOV) with a suitable resolution. There have also been various single sensor catadioptric designs; for example, designs produced by Realtime Immersion, Inc. of Westborough, Mass., US. Although this approach can provide the VFOV not available from single sensor fisheye lens designs, they fail to provide a suitable depth of field including 0.5 m to 10 m, as discussed in S. Baker and S. K. Nayar, "A theory of single-viewpoint catadioptric image formation," International Journal of Computer Vision, 35(2):175-196, 1999. Some designs utilize more than two sensors and a mirror or prism arrangement providing a small common center of projection (a camera's center of projection is the point about which the camera can be rotated and not induce parallax) that can reduce image stitching errors to less than one pixel. U.S. Pat. No. 7,495,694 (entitled "Omni-directional camera with calibration and up look angle improvements" and issued on Feb. 24, 2009), which is incorporated by reference herein in its entirety, describes, among other things, examples of designs using five sensors. Although such designs offer suitable performance, they are costly to manufacture, and a lower cost approach is desirable.

There have been various attempts at stitching images from wide baseline cameras. Although the hardware design is simpler than designs such as the above-mentioned arrangement of more than two sensors and a mirror or prism arrangement, there are significant unsolved image processing issues. To create a seamless panorama, a depth needs to be correctly estimated for each pixel, which still is an open (unsolved) problem in computer vision. Approximations are computationally expensive and fail to generate frames at suitably high resolutions in real time (as illustrated by F. Perazzi, A. Sorkine-Hornung, H. Zimmer, P. Kaufmann, O. Wang, S. Watson, M. Gross, Panoramic Video from Unstructured Camera Arrays, Computer Graphics Forum (Proc. Eurographics 2015), Vol. 34, No. 2, May 2015, Zurich, Switzerland), and in addition will likely fail to fulfill stitching performance and subjective user experience requirements.

Another design approach involves the use of two sensors and a mirror or prism to provide a compact optical arrangement for capturing 360-degree images. It is significantly less costly to manufacture these designs than the above-mentioned arrangement of more than two sensors and a mirror or prism arrangement. U.S. Pat. No. 10,151,905 (entitled "Image capture system and imaging optical system" and issued on Dec. 11, 2018), which is incorporated by reference herein in its entirety, illustrates an example of this design approach. This application describes various designs and methods that overcome shortcomings encountered with previous implementations of this design approach. For example, designs described in this application offer a significantly higher image resolution.

Figure 1C:
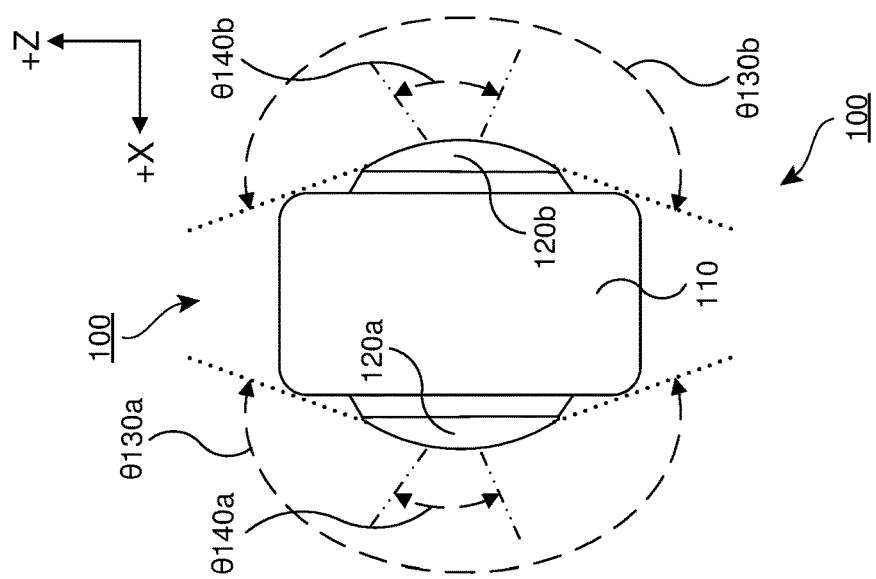
Figure 1A:
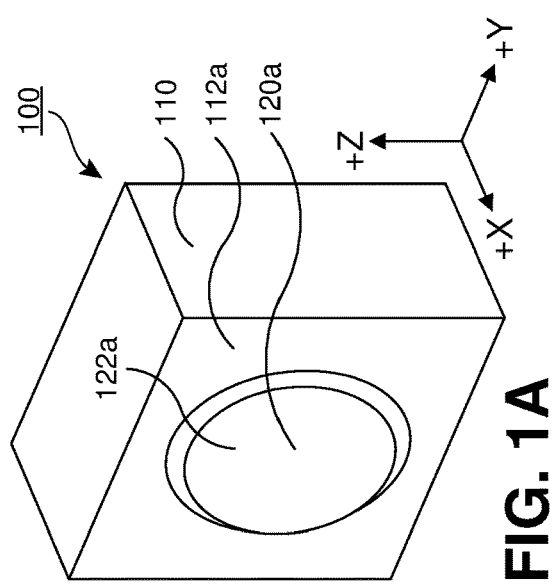
Figure 1B:
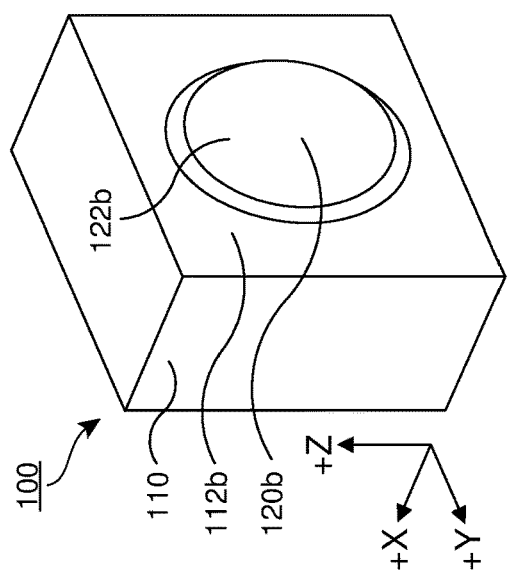

FIGS. 1A-1D illustrate an example implementation of a first panoramic camera 100 configured to use two image sensors and respective lenses 120a and 120b to produce 360-degree image. FIG. 1A shows a front top isometric view of the first panoramic camera 100. The first panoramic camera 100 includes an enclosure 110 (which may be referred to as a "housing") and a first lens 120a with an optical axis along the X axis and having an object surface 122a ("external surface" or "first surface") extending from and raised relative to a front side 112a ("front surface") of the enclosure 110 of the first panoramic camera 100. FIG. 1B shows a front rear isometric view of the first panoramic camera 100. The first panoramic camera 100 includes a second lens 120*b* with an optical axis along the X axis and having an object surface 122*b* extending from and raised relative to a rear side ("read surface") of the enclosure 110 of the first panoramic camera 100. As shown in FIGS. 1A and 1B the first lens 110*a* and the second lens 110*b* are mounted partially within the enclosure 110 with the lenses 120*a* and 120*b* protruding from and raised relative to an outer surface of the enclosure 110.

FIG. 1C shows a right side view of the first panoramic camera 100. The first lens 120*a* has a VFOV θ130*a*, and the second lens 120*b* has a VFOV θ130*b*. A first image sensor corresponding to the first lens 120*a* has a VFOV θ140*a*, and a second image sensor corresponding to the second lens 120*b* has an VFOV θ140*b*. In this example, the VFOVs 130*a* and 130*b* are 220 degrees and the VFOVs θ140*a* and θ140*b* are about 60 degrees, although in some examples other values may be used. In some implementations, the first lens 120*a* and the second lens 120*b* are anamorphic lenses having a higher focal length and/or a lower field of view in the vertical direction than in the horizontal direction, allowing for a selected reduction in the VFOVs 0140*a* and 0140*b* to increase the angular pixel density in the vertical direction in comparison to non-anamorphic lenses with equal focal lengths and fields of view in the horizontal and vertical directions. An anamorphic lens may be implemented by incorporating cylindrical lens elements. In some examples, computer-assisted lens design and manufacturing techniques can be used to implement a wide-angle anamorphic lens with specified anamorphosis and/or distortion characteristics in selected portions of the field of view; such as via "panomorph" lens design tools available from ImmerVision of Montréal, Quebec, CA. In some examples, the VFOVs θ130*a* and θ130*b* may be different. In some examples, the VFOVs θ140*a* and θ140*b* may be different. For implementations using two lenses, the term "wide-angle lens" refers to a lens having an HFOV of at least 180 degrees.

FIG. 1D shows a top plan view of the first panoramic camera 100. The first lens 120*a* has a horizontal field of view (HFOV) 0132*a*, and the second lens 120*b* has an HFOV θ132*b*. The first image sensor corresponding to the first lens 120*a* has an HFOV θ150*a*, and the second image sensor corresponding to the second lens 120*b* has an HFOV θ150*b*. In this example, the HFOVs 132*a* and 132*b* of the lenses 120*a* and 120*b* are 220 degrees and the HFOVs θ150*a* and θ150*b* of their respective image sensors image sensors are 190 degrees. In some examples, the HFOVs 132*a* and 132*b* may be different. In some examples, the HFOVs θ150*a* and θ150*b* may be different. In some examples, the VFOV θ130*a* and the HFOV θ132*a* may be different. In some examples, the VFOV θ130*a* and the HFOV θ132*b* may be different.

Figure 1E:
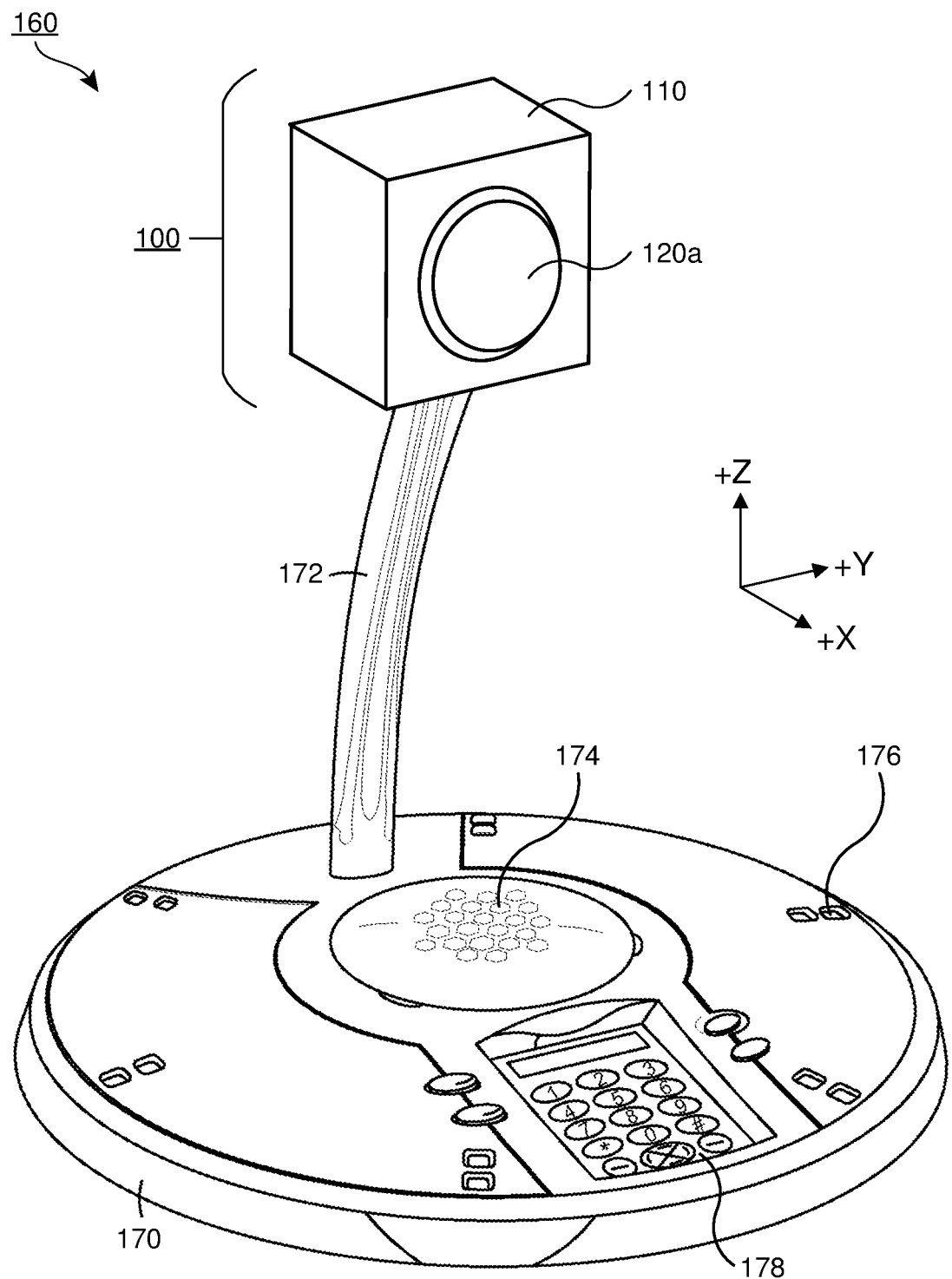
FIGS. 1E-1F illustrate an example implementation of an integrated camera system incorporating the first panoramic camera shown in FIGS. 1A-1D.
Figure 1F:
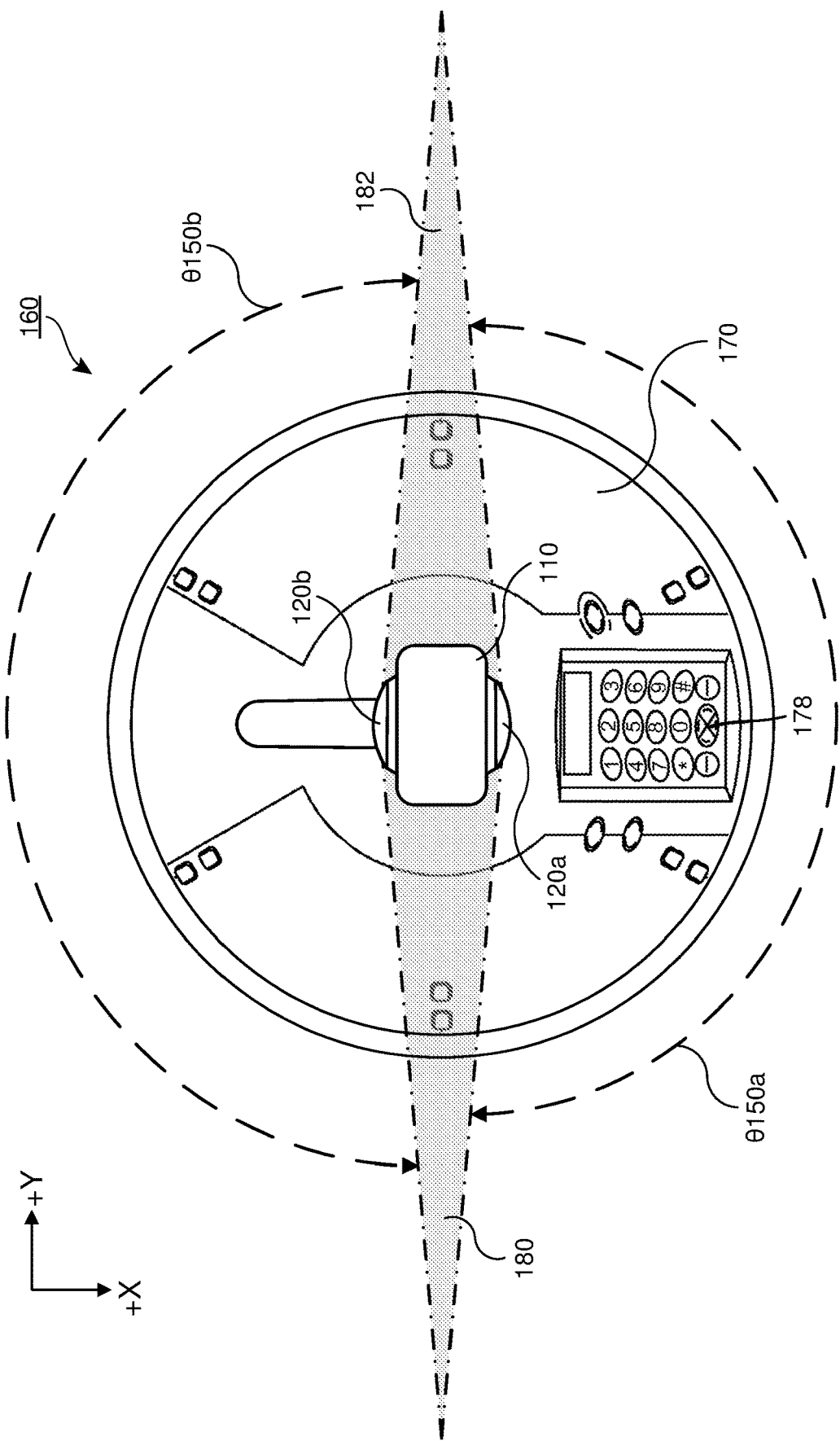

FIGS. 1E-1F illustrate an example implementation of an integrated camera system 160 incorporating the first panoramic camera 100 shown in FIGS. 1A-1D. FIG. 1E shows a front top isometric view of the integrated camera system 160. The integrated camera system 160 includes a base 170, from which a riser 172 extends upward and supports the first panoramic camera 100. The integrated camera system 160 also includes a speaker 174, microphones 176, and a control panel 178. In the example shown in FIG. 1E, the speaker 174, microphones 176, and/or control panel 178 are included in the base 170. FIG. 1F shows a top plan view of the integrated camera system 160.

Figure 2A:
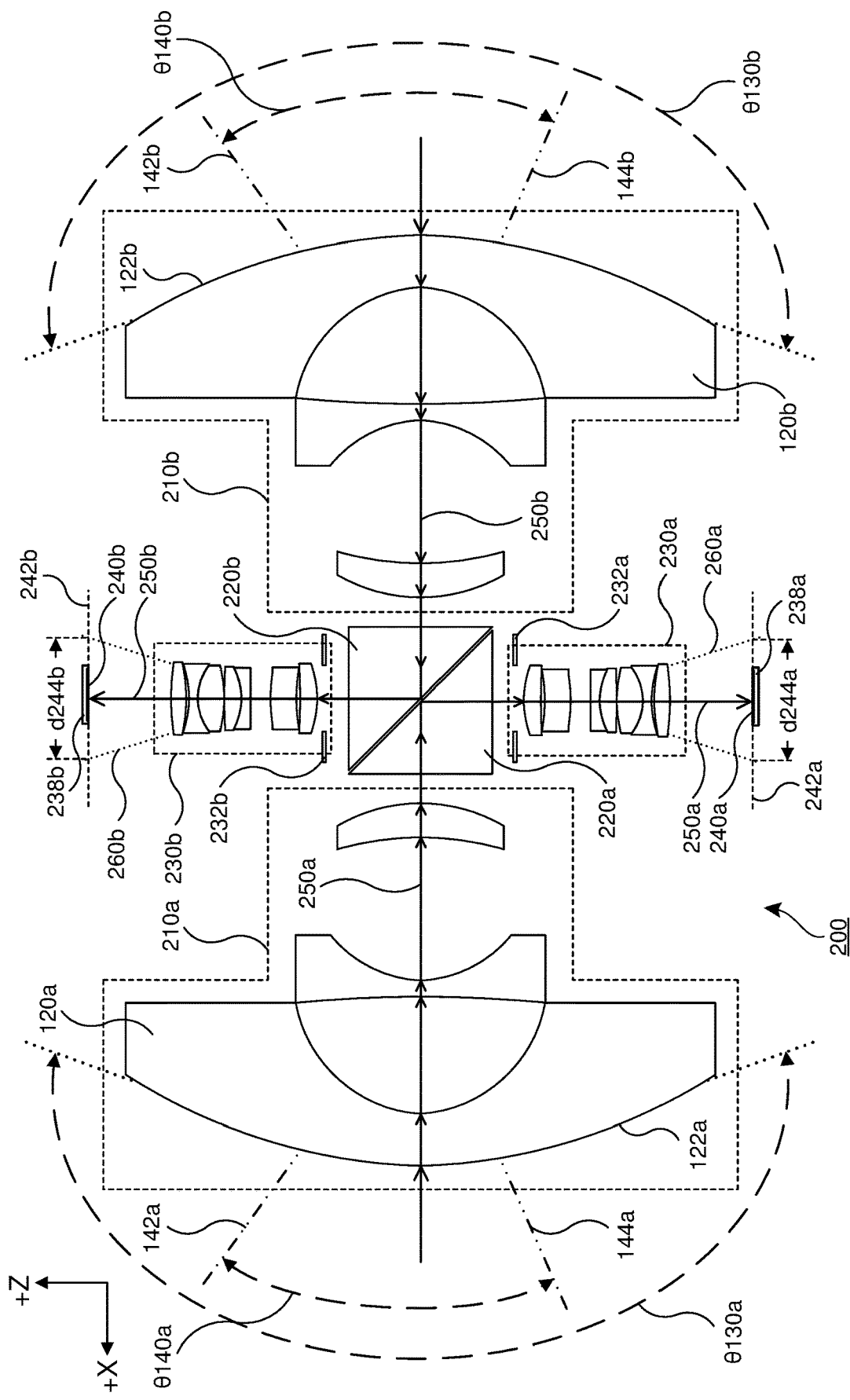
FIG. 2A shows a vertical cross section view of an example implementation of a second panoramic camera in which first and second image sensors are arranged vertically.

FIG. 2A shows a vertical (parallel to the X-Z plane) cross section view of an example implementation of a second panoramic camera 200 in which first and second imaging surfaces 240*a* and 240*b* or respective first and second image sensors 238*a* and 238*b* are arranged vertically. The first lens 120*a* includes a front lens group 210*a*, a reflector 220*a*, an aperture 232*a*, a rear lens group 230*a*, and has an optical axis 250*a* (which may also be referred to as a "chief ray" of the first lens 120*a*). Light received by the first lens 120*a* passes through the front lens group 210*a* and is reflected by the reflector 220*a* to pass through the aperture 232*a* and the rear lens group 230*a*, with the first lens 120*a* projecting and guiding a first image formation light flux 260*a* (which may be referred to as "image formation light rays") to the first imaging surface 240*a*. The reflector 220*a* may comprise a mirror, prism, and/or reflecting film. A front side of the first imaging surface 240*a*, that receives light from the first lens 120*a*, lies in a first imaging plane 242*a* (parallel to the X-Y plane) at which the first image formation light flux 260*a* has a first height d244*a* (which may be referred to as an "image circle height") in the direction of the X-axis. The second lens 120*b* includes a front lens group 210*b*, a reflector 220*b*, an aperture 232*b*, a rear lens group 230*b*, and has an optical axis 250*b* ("chief ray"). Light received by the second lens 120*b* passes through the front lens group 210*b* and is reflected by the reflector 220*b* to pass through the aperture 232*b* and the rear lens group 230*b*, with the second lens 120*b* projecting and guiding a second image formation light flux 260*b* to the second imaging surface 240*b*. The reflector 220*b* may comprise a mirror, prism, and/or reflecting film. A front side of the second imaging surface 240*b* lies in a second imaging plane 242*b* (parallel to the X-Y plane) at which the second image formation light flux 260*b* has a second height d244*b* in the direction of the X-axis.

In some implementations, as shown in FIG. 2A, a top 142*a* ("upper extent") of the first VFOV θ140*a* is at a greater angle from the Z-axis (and the optical axis 250*b* for the front lens group 210*a*) than the bottom 144*a* ("lower extent") of the first VFOV θ140*a*, which is useful for tabletop video conferencing applications. In some examples, this is implemented using a "view camera" effect, in which a center of the first imaging surface 240*a* (and the first imaging sensor 238*a*) is shifted or otherwise positioned in the negative X-axis direction from the chief ray 250*a*, with the first imaging surface 240*a* being perpendicular to the chief ray 250*a* of the first lens 120*a*. Likewise, the view camera effect can be applied for the second imaging surface 240*b* (and second imaging sensor 238*a*), placing a top 142*b* and a bottom 144*b* of the second VFOV θ140*b* at the same angles with respect to the optical axis 250*b* (and/or the X-axis) as the respective angles of the top 142*a* and the bottom 144*a* with respect to the optical axis 250*a* (and/or the X-axis).

With the front lens group 210*a* and the front lens group 210*b* arranged coaxially, a significant reduction in stitching error is obtained over a non-coaxial arrangement; for example, a stitching error can be reduced from 14 pixels to about 5 pixels in certain implementations. Additionally, with the front lens group 210*a* and the front lens group 210*b* arranged coaxially, stitching errors can be "fixed" adaptively by searching for a correct object depth using a significantly smaller window; for example, a 14×14 window can be reduced to a 5×5 window in certain implementations. Further, with the front lens group 210*a* and the front lens group 210*b* arranged coaxially, the epipolar constraint can be applied to perform a linear depth search, offering a significant speedup that facilitates real-time panoramic image stitching.

Figure 2B:
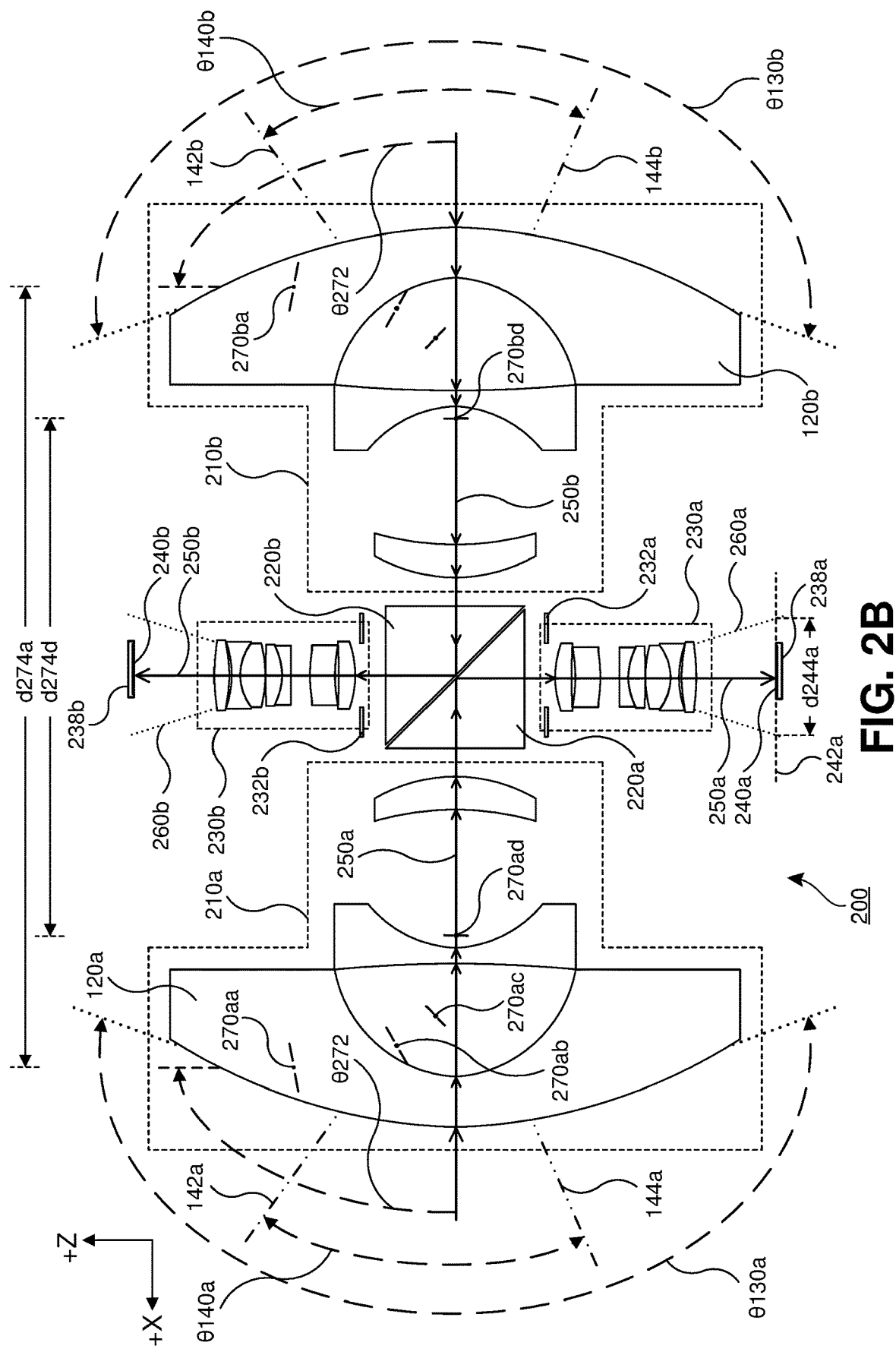
FIG. 2B shows a vertical cross section view of an example implementation of the second panoramic camera.

FIG. 2B shows a vertical cross section view of an example implementation of the second panoramic camera 200, which includes the various features of the second panoramic camera 200 shown in FIG. 2A. In some examples, as shown in FIG. 2B, the first lens 120a has a first edge of field entrance pupil 270aa (or more simply, "first entrance pupil") for an incoming ray at a first angle θ272 from the optical axis of the front lens group 210a. In this example, the first angle θ272 for the first edge of field entrance pupil 270aa is approximately 90 degrees (for example, 90 degrees in the X-Y plane), corresponding to an angular position at which panoramic image stitching is likely to occur between an image captured by the first image sensor 238a and an image captured by the second image sensor 238b; additionally, a second entrance pupil 270ab for a second angle of approximately 60 degrees, a third entrance pupil 270ac for a second angle of approximately 45 degrees, and a fourth center of field entrance pupil 270ad (or more simply, "fourth entrance pupil") for an angle of 0 degrees are shown. The second lens 120b has a fifth edge of field entrance pupil 270ba (or more simply, "fifth entrance pupil") for an incoming ray at the same first angle θ272 from the optical axis of the front lens group 210b, and a sixth center of field entrance pupil 270bd (or more simply, "sixth entrance pupil") for an angle of 0 degrees.

The first lens 120a and the second lens 120b are arranged closely to reduce parallax errors between images captured by the image sensors 238a and 238b. In some implementations, the first lens 120a and the second lens 120b are arranged with a distance d274a between the first edge of field entrance pupil 270aa and the fifth edge of field entrance pupil 270ba. In some implementations, the distance d274a is less than or equal to 25 mm. In some implementations, the distance d274a is less than or equal to 10 mm. In some implementations, the first lens 120a and the second lens 120b are arranged with a distance d274d between the fourth center of field entrance pupil 270ad and the sixth center of field entrance pupil 270bd. In some implementations, the distance d274d is less than or equal to 25 mm. In some implementations, the distance d274d is less than or equal to 10 mm. In some implementations, the view camera effect described in connection with FIG. 2A is used in the example shown in FIG. 2B.

Figure 3A:
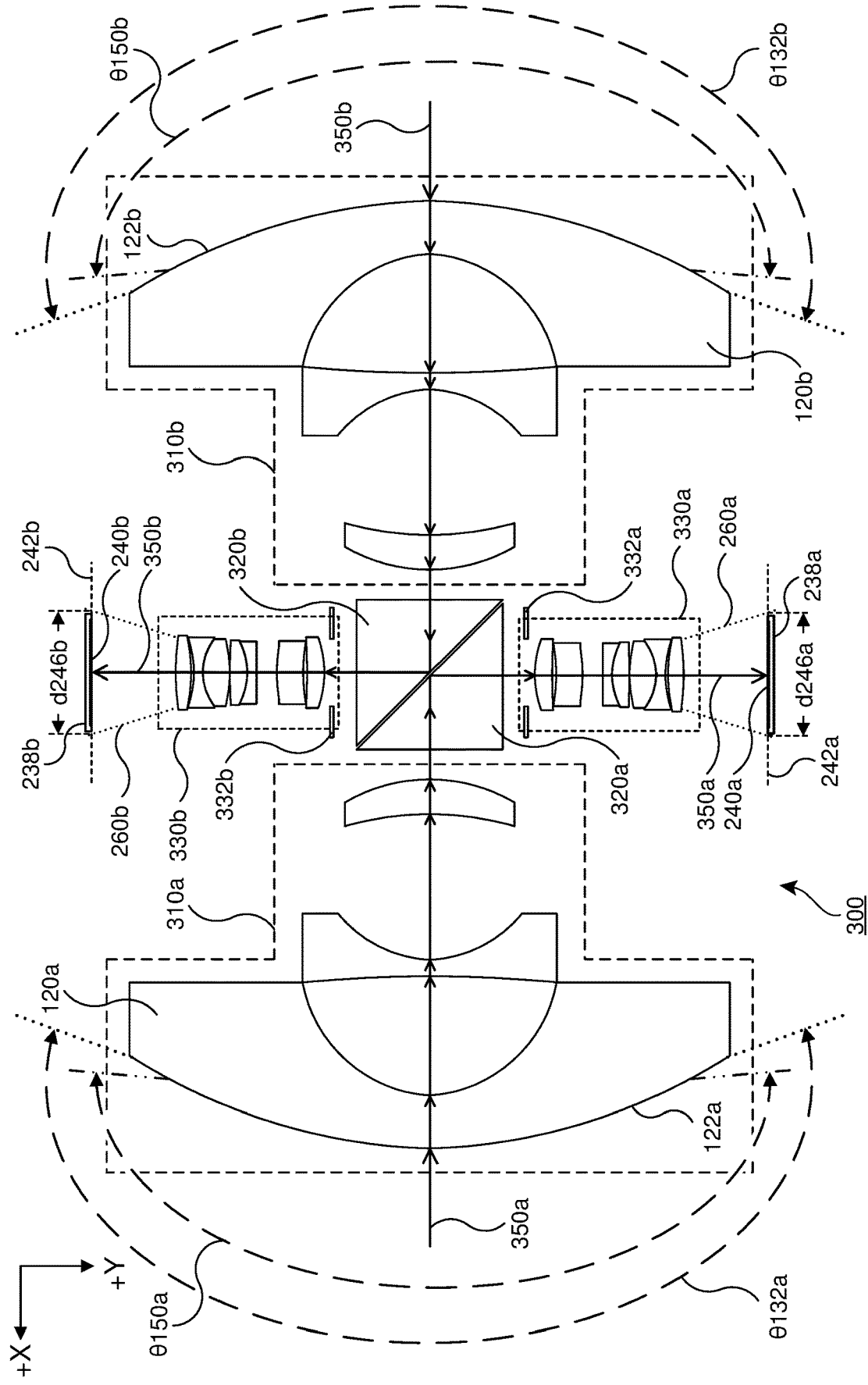
FIG. 3A shows a horizontal cross section view of an example implementation of a third panoramic camera in which the first and second image sensors are instead arranged horizontally.

FIG. 3A shows a horizontal (parallel to the X-Y plane) cross section view of an example implementation of a third panoramic camera 300 in which the first and second imaging surfaces 240a and 240b are instead arranged horizontally. There is a similar configuration for the first lens 120a of a front lens group 310a, a reflector 320a, an aperture 332a, a rear lens group 330a, an optical axis 350a, and a first image formation light flux 260a as shown in FIG. 2A, so their descriptions are omitted. Likewise, there is a similar configuration for the second lens 120b of a front lens group 310b, a reflector 320b, an aperture 332b, a rear lens group 330b, an optical axis 350b, and a second image formation light flux 260b as shown in FIG. 2A, so their descriptions are omitted. A front side of the first imaging surface 240a lies in a first imaging plane 242a (parallel to the X-Z plane) at which the first image formation light flux 260a has a first width d246a (which may be referred to as an "image circle width") in the direction of the X-axis. A front side of the second imaging surface 240b lies in a second imaging plane 242b (parallel to the X-Z plane) at which the second image formation light flux 260b has a second width d246a in the direction of the X-axis. In the third panorama camera 300, the front lens group 310a and the front lens group 310b are arranged coaxially or have respective optical axes within 1 mm of each other, as described above from the second panorama camera 200 and with similar benefits obtained.

Figure 3B:
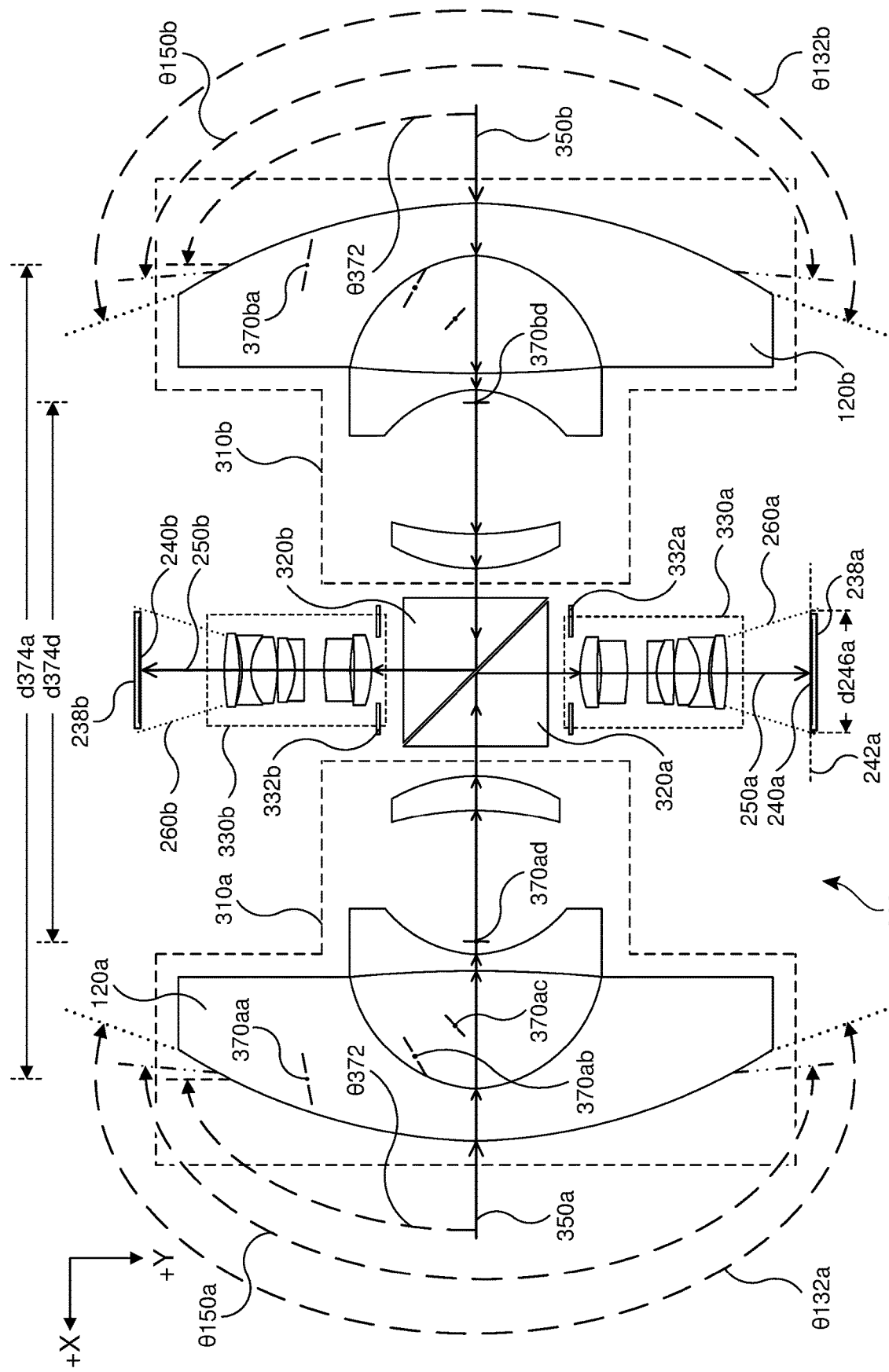
FIG. 3B shows a horizontal cross section view of an example implementation of the third panoramic camera.

FIG. 3B shows a horizontal cross section view of an example implementation of the third panoramic camera 300, which includes the various features of the third panoramic camera 300 shown in FIG. 3A. In some examples, as shown in FIG. 3B, the first lens 120a has a first edge of field entrance pupil 370aa for an incoming ray at a first angle θ372 from the optical axis of the front lens group 310a. In this example, the first angle θ372 for the first edge of field entrance pupil 370aa is approximately 90 degrees (for example, 90 degrees in the X-Y plane), corresponding to an angular position at which panoramic image stitching is likely to occur between an image captured by the first image sensor 238a and an image captured by the second image sensor 238b; additionally, a second entrance pupil 370ab for a second angle of approximately 60 degrees, a third entrance pupil 370ac for a third angle of approximately 45 degrees, and a fourth center of field entrance pupil 370ad (or more simply, "fourth entrance pupil") for an angle of 0 degrees are shown. The second lens 120b has a fifth edge of field entrance pupil 370ba (or more simply, "fifth entrance pupil") for an incoming ray at the same first angle θ372 from the optical axis of the front lens group 310b, and a sixth center of field entrance pupil 370bd (or more simply, "sixth entrance pupil") for an angle of 0 degrees.

The first lens 120a and the second lens 120b are arranged closely to reduce parallax errors between images captured by the image sensors 238a and 238b. In some implementations, the first lens 120a and the second lens 120b are arranged with a distance d374a between the first edge of field entrance pupil 370aa and the fifth edge of field entrance pupil 370ba. In some implementations, the distance d374a is less than or equal to 25 mm. In some implementations, the distance d374a is less than or equal to 10 mm. In some implementations, the first lens 120a and the second lens 120b are arranged with a distance d374d between the fourth center of field entrance pupil 370ad and the sixth center of field entrance pupil 370bd. In some implementations, the distance d374d is less than or equal to 25 mm. In some implementations, the distance d374d is less than or equal to 10 mm. In some implementations, the view camera effect described in connection with FIG. 2A is used in the examples shown in FIGS. 3A and 3B.

FIGS. 4A-4D illustrate various configurations for the first image formation light flux 260a shown in FIG. 2A or FIG. 2B for the second panoramic camera 200 and in FIG. 3A or FIG. 3B for the third panoramic camera 300 in relation to the first imaging surface 240a of the first image sensor 238a, in which the first imaging surface 240a has an aspect ratio of 16:9. The aspect ratio is a ratio of a width 410 of the first imaging surface 240a in a first direction 402 (the Y-axis for the second panoramic camera 200, or the X-axis for the third panoramic camera 300) to a height 412 of the first imaging surface 240a in a second direction 404 (the Y-axis for the second panoramic camera 200, or the X-axis for the third panoramic camera 300) perpendicular to the first direction 402. In FIGS. 4A-4D, the first image formation light flux 260a is shown as a first image circle 260a (with a height d244a in the second direction 404 and a width d246a in the first direction 402) at a plane of the first imaging surface 240a (shown as the first imaging plane 242a in FIGS. 2A-3B). It is understood that the first image formation light flux 260a refers to the portion of the light flux projected by the lens 120a toward the first imaging surface 240a that, at the first imaging plane 242a, is suitable for, and may result in image data suitable for, panoramic image processing. For example, although the first lens 120a will likely project additional light flux toward the first imaging surface 240a in an area outside of the image circle 260a, outside of the image circle 260a optical errors, such as, but not limited to, vignetting, decreased saturation, decreased resolution, or distortion, are too great for producing suitable image data (in some examples, even despite image correction that is successfully applied for other areas within the image circle 260a). In some examples, the image circle 260a is not circular and the height d244a is different than the width d246a.

FIGS. 4A-4D each illustrate a front side of the first imaging surface 240a, which is configured to receive and measure light received by the first lens 120a and generate corresponding image data. For the second panoramic camera 200 shown in FIG. 2A or FIG. 2B, FIGS. 4A-4D illustrate the front side of the first image sensor 238a, including the first imaging surface 240a, as viewed downward along the Z-axis and with the front side of the first imaging surface 240a arranged parallel to the X-Y plane. For the third panoramic camera 300 shown in FIG. 3A or FIG. 3B, FIGS. 4A-4D illustrate the front side of the first image sensor 238a, including the first imaging surface 240a, as viewed rightward along the Y-axis and with the front side of the first imaging surface 240a arranged parallel to the X-Z plane. In FIG. 4A, a diameter 420 of the image circle 260a (and also the width d246a and the height d244a of the image circle 260a) is equal to the height 412 of the first imaging surface 240a. In FIG. 4B, a diameter 422 of the image circle 260a (and also the width d246a and the height d244a of the image circle 260a) is equal to the width 410 of the first imaging surface 240a. In FIG. 4C, a diameter 424 of the image circle 260a (and also the width d246a and the height d244a of the image circle 260a) is equal to a diagonal length 414 of the first imaging surface 240a (a distance between opposite corners 416 and 418 of the first imaging surface 240a). In FIG. 4C, the image circle 260a has a diagonal width d448a in a third direction 406 parallel to the diagonal of the first imaging surface 240a between the corners 416 and 418 that is equal to the diagonal length 414 of the first imaging surface 240a. In FIG. 4D, a diameter 426 of the image circle 260a (and also the width d246a and the height d244a of the image circle 260a) is larger than the diagonal length 414 of the first imaging surface 240a. In FIG. 4D, the diagonal width d448a of the image circle 260a in the third direction 406 is greater than the diagonal length 414 of the first imaging surface 240a. In implementations in which the image circle 260a has a diameter and/or the diagonal width d448a greater than or equal to the diagonal length 414, as shown in FIGS. 4C and 4D, the entire first imaging surface 240a can capture useful image data, with increased angular resolution versus the example in FIG. 4A.

The below tables are for a 190 degree minimum field of view for an example of the first imaging surface 240a which has a diagonal length 414 of 1/2.3", a width 410 of 9.63 mm and a height 412 of 5.41 mm. The rows labeled "shiftable" are for a design obtaining a plus or minus 10 degree shift in the VFOV (as discussed in connection with FIGS. 6A-8B), and the indicated VFOV includes the VFOV of the first imaging surface 240a plus the additional 20 degrees available via shifting.

TABLE 1 stereographic lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 4A) | 190 | 2.48 | 5.41 | 190 | |
| Cropped Circle (FIG. 4B) | 190 | 4.41 | 9.63 | 126.1 | 190 |
| Full Frame (FIG. 4C) | 206 | 4.39 | 11.04 | 126.6 | 190.5 |
| Shiftable (FIG. 4D) | 212 | 4.38 | 11.63 | 146.8 (126.8 + 20) | 190.7 |

TABLE 2 equidistant lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 4A) | 190 | 3.27 | 5.41 | 190 | |
| Cropped Circle (FIG. 4B) | 190 | 5.81 | 9.63 | 106.9 | 190 |
| Full Frame (FIG. 4C) | 218 | 5.80 | 11.04 | 106.9 | 190 |
| Shiftable (FIG. 4D) | 229 | 5.79 | 11.57 | 127.2 (107.2 + 20) | 190.5 |

TABLE 3 equisolid lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 4A) | 190 | 3.67 | 5.41 | 190 | |
| Cropped Circle (FIG. 4B) | 190 | 6.53 | 11.04 | 98 | 190 |
| Full Frame (FIG. 4C) | 231 | 6.53 | 11.04 | 98 | 190 |
| Shiftable (FIG. 4D) | 250 | 6.52 | 11.57 | 118 (98 + 20) | 190.1 |

FIGS. 5A-5D illustrate various configurations for the first image formation light flux 260a shown in FIG. 2A or FIG. 2B for the second panoramic camera 200 and in FIG. 3A or FIG. 3B for the third panoramic camera 300 in relation to first imaging surface 240a of the first image sensor 238a, in which the first imaging surface 240a has an aspect ratio of 2:1. The aspect ratio is a ratio of a width 510 of the first imaging surface 240a in a first direction 502 (the Y-axis for the second panoramic camera 200, or the X-axis for the third panoramic camera 300) to a height 512 of the first imaging surface 240a in a second direction 504 (the Y-axis for the second panoramic camera 200, or the X-axis for the third panoramic camera 300) perpendicular to the first direction 502. In FIGS. 5A-5D, the first image formation light flux 260a is shown as a first image circle 260a (with a height d244a in the second direction 504 and a width d246a in the first direction 502) at a plane of the first imaging surface 240a (shown as the first imaging plane 242a in FIGS. 2A-3B).

FIGS. 5A-5D each illustrate a front side of the first image sensor 238a, including the first imaging surface 240a, according to the same arrangements described for FIGS. 4A-4D in connection with the second panoramic camera 200 and the third panoramic camera 300, as indicated by the illustrated axes. One possible benefit of the wider and greater 2:1 aspect ratio than the 16:9 aspect ratio in FIGS. 4A-4D is an increased number of columns of pixels along the width 510 of the first imaging surface 240a without a corresponding reduction in pixel width, resulting in higher horizontal angular resolution without reducing image quality. It is understood that additional aspect ratios may be used. In FIG. 5A, a diameter 520 of the image circle 260a (and also the width d246a and the height d244a of the image circle 260a) is equal to a height 512 of the first imaging surface 240a. In FIG. 5B, a diameter 522 of the image circle 260a (and also the width d246a and the height d244a of the image circle 260a) is equal to a width 510 of the first imaging surface 240a. In FIG. 5C, a diameter 524 of the image circle 260a (and also the width d246a and the height d244a of the image circle 260a) is equal to a diagonal length 514 of the first imaging surface 240a (a distance between opposite corners 516 and 518 of the first imaging surface 240a). In FIG. 5C, the image circle 260a has a diagonal width d548a in a third direction 506 parallel to the diagonal of the first imaging surface 240a between the corners 516 and 518 that is equal to the diagonal length 514 of the first imaging surface 240a. In FIG. 5D, a diameter 526 of the image circle 260a (and also the width d246a and the height d244a of the image circle 260a) is larger than the diagonal length 514 of the first imaging surface 240a. In FIG. 5D, the diagonal width d548a of the image circle 260a in the third direction 506 is greater than the diagonal length 514 of the first imaging surface 240a. In implementations in which the image circle 260a has a diameter and/or the diagonal width d548a greater than or equal to the diagonal length 514, as shown in FIGS. 5C and 5D, the entire first imaging surface 240a can be used to capture image data, with increased angular resolution versus the example in FIG. 5A.

Figure 5G:
FIGS. 5E-5H show various example images corresponding to FIGS. 5A, 5B, and 5D.
Figure 5H:
Figure 5E:
Figure 5F:
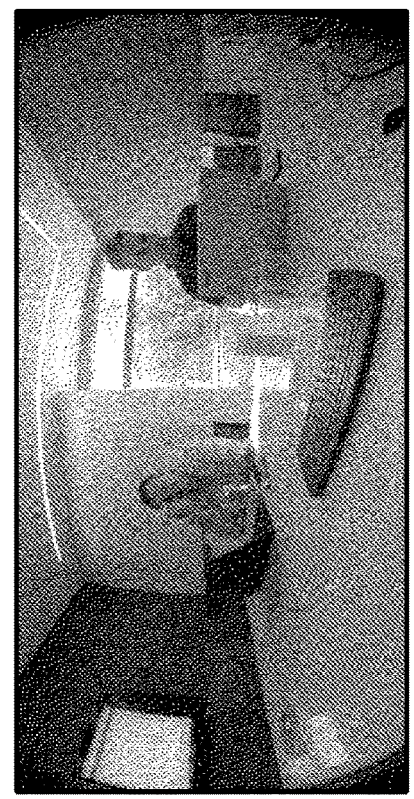

FIGS. 5E-5H show various example images corresponding to FIGS. 5A, 5B, and 5D. FIG. 5E shows an example corresponding to FIG. 5A. FIG. 5F shows an example corresponding to FIG. 5B. FIG. 5G shows an example corresponding to FIG. 5D. FIG. 5H shows an example corresponding to FIG. 5D, but in which the VFOV has been shifted upward such that less of the field of view is used to capture a desk and such that if a person stands, they are likely to remain in the field of view. Additionally, it is noted that a lens mapping function can affect the field of view required for the lenses 120a and 120b. Examples of such mappings include stereographic, equidistant, and equisolid.

The below tables are for a 190 degree minimum field of view for an example of the first imaging surface 240a which has a width 510 of 10.83 mm and a height 512 of 5.41 mm. The rows labeled "shiftable" are for a design obtaining a plus or minus 10 degree shift in the VFOV (as discussed in connection with FIGS. 6A-8B), and the indicated VFOV includes the VFOV of the first imaging surface 240a plus the additional 20 degrees available via shifting.

TABLE 4 stereographic lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 5A) | 190 | 2.48 | 5.41 | 190 | |
| Cropped Circle (FIG. 5B) | 190 | 4.96 | 10.83 | 104.5 | 190 |
| Full Frame (FIG. 5C) | 203 | 4.95 | 12.11 | 104.8 | 190.3 |
| Shiftable (FIG. 5D) | 208 | 4.95 | 12.68 | 134.6 (114.6 + 20) | 190.2 |

TABLE 5 equidistant lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 5A) | 190 | 3.27 | 5.41 | 190 | |
| Cropped Circle (FIG. 5B) | 190 | 6.53 | 10.83 | 95 | 190 |
| Full Frame (FIG. 5C) | 213 | 6.51 | 12.11 | 95.3 | 190.5 |
| Shiftable (FIG. 5D) | 222 | 6.53 | 12.66 | 115 (95 + 20) | 190 |

TABLE 6 equisolid lens

| | Lens field of view (degrees) | Lens focal length (mm) | Image circle diameter | Imaging surface VFOV (degrees) | Imaging surface HFOV (degrees) |
|---|---|---|---|---|---|
| Circular (FIG. 5A) | 190 | 3.67 | 5.41 | 190 | |
| Cropped Circle (FIG. 5B) | 190 | 7.34 | 10.83 | 86.5 | 190 |
| Full Frame (FIG. 5C) | 222 | 7.35 | 12.11 | 86.5 | 190 |
| Shiftable (FIG. 5D) | 239 | 7.33 | 12.67 | 106.6 (86.6 + 20) | 190.3 |

It is noted that in all of the examples shown in Tables 1-6 for FIGS. 4B-4D and 5B-5D, the VFOV received by the first imaging surface 240a is less than 130 degrees, which increases the angular pixel density in the vertical direction compared to the examples of FIGS. 4A and 5A. In some implementations, the VFOV received by the first imaging surface 240a is less than or equal to 90 degrees, further increasing the angular density. In some implementations, the VFOV received by the first imaging surface 240a is less than or equal to 90 degrees. In some implementations, the VFOV received by the first imaging surface 240a is less than or equal to 70 degrees (for example, approximately 60 degrees, as in the examples shown in FIGS. 1C and 2A), further increasing the angular density while providing a VFOV that is useful for tabletop videoconferencing applications. As previously discussed, in some implementations the lenses 120a and 120b are anamorphic lenses having a higher focal length and/or a lower field of view in the vertical direction than in the horizontal direction to achieve a lower VFOV while maintaining an HFOV of greater than 180 degrees and using image sensor devices with commonly available aspect ratios, such as the 16:9 aspect ratio in FIGS. 4A-4D or the 2:1 aspect ratio in FIGS. 5A-5D.

FIGS. 6A-6F show an example in which the second panoramic camera 200 shown in FIG. 2A or FIG. 2B and/or the third panoramic camera 300 shown in FIG. 3A or FIG. 3B is/are configured to mechanically shift or otherwise displace the first image sensor 238a to cause a corresponding shift in a VFOV obtained by the first imaging surface 240a. The convenience of discussion, in FIGS. 6B, 6D, and 6F, the second panoramic camera 200 and/or the third panoramic camera 300 is referred to as a fourth panoramic camera 600.

In FIGS. 6A and 6B, the first image sensor 238a is in a first sensor position 610a (which may be referred to as a "home" or "initial" position) corresponding to the position of the first image sensor 238a in FIGS. 1C, 2, 3, 4D, and 5D. In FIGS. 6C and 6D, the first image sensor 238a (including the first imaging surface 240a) has been shifted from the first sensor position 610a in a positive lateral direction (along the X axis in the positive direction for the second panoramic camera 200, and along the Z axis in the positive direction for the third panoramic camera 300) to a second sensor position 612a. As a result, the VFOV obtained by the first imaging surface 240a has made a corresponding shift downward from the first VFOV θ140a shown in FIG. 6B to a second VFOV θ620a. In this example, at the second sensor position 612a further movement of the first image sensor 238a in the positive lateral direction would cause a portion of the first imaging surface 240a to exit the image circle 260a. FIG. 6C shows a first position 650 of a first corner of the first imaging surface 240a while in the second sensor position 612a. In FIGS. 6E and 6F, the first image sensor 238a has been shifted in a negative lateral direction with respect to the first and second sensor positions 610a and 612a shown in FIGS. 6A and 6C, to a third sensor position 612a. As a result, the VFOV obtained by the first imaging surface 240a has made a corresponding shift upward from to a third VFOV θ630a. In this example, at the third sensor position 614a further movement of the first image sensor 238a in the negative lateral direction would cause a portion of the first imaging surface 240a to exit the image circle 260a. FIG. 6E shows a second position 652 of a second corner of the first imaging surface 240a, opposite to the first corner for the first position 650, while in the third sensor position 614a, and a distance d654 between the positions 650 and 652. In this example, the width d246a of the image circle 260a is equal to the distance d654.

Additionally, the fourth panoramic camera 600 is configured to mechanically shift both the first image sensor 238a and the second image sensor 238b together in the same directions to obtain matching VFOVs for their respective imaging surfaces 240a and 240b. Thus, in FIG. 6B, the second image sensor 238b is in an initial sensor position (not shown in FIG. 6B) resulting in a first VFOV θ140b for the second imaging surface 240b matching the first VFOV θ140a for the first imaging surface 240a. For example, a top 142a of the first VFOV θ140a and a top 142b of the first VFOV θ140b both form a same angle with the Z axis, as do a bottom 144a of the first VFOV θ140a and a bottom 144b of the first VFOV θ140b. Also, in FIGS. 6C and 6D the second image sensor 238b has also been shifted in the positive lateral direction at the same time as the first image sensor 238a. As a result, the VFOV obtained by the second imaging surface 240b has made a corresponding shift downward from the first VFOV θ140b shown in FIG. 6B to a second VFOV θ620b for the second imaging surface 240b matching the second VFOV θ620a for the first imaging surface 240a. For example, a top 622a of the second VFOV θ620a and a top 622b of the second VFOV θ620b both form a same angle with the Z axis, as do a bottom 624a of the second VFOV θ620a and a bottom 624b of the second VFOV θ620b. Similarly, in FIGS. 6E and 6F the second image sensor 238b has been shifted in the negative lateral direction at the same time as the first image sensor 238a. As a result, the VFOV obtained by the second imaging surface 240b has made a corresponding shift upward from the to a third VFOV θ630b matching the third VFOV θ630a for the first imaging surface 240a. For example, a top 632a of the third VFOV θ630a and a top 632b of the third VFOV θ630b both form a same angle with the Z axis, as do a bottom 634a of the third VFOV θ630a and a bottom 634b of the second VFOV θ630b. It is noted that the tops 142a, 142b, 622a, 622b, 632a, and 632b and the bottoms 144a, 144b, 624a, 624b, 634a each lie in a plane parallel to the X-Z plane passing through the optical axis 250a or 250b.

The example shown in FIGS. 6A-6F shows a full range of shifting for the first image sensor 238a. In some examples, the full range of shifting includes a plus or minus 10 degree shift in VFOV for the first imaging surface 240a. It is understood that although three sensor positions 610a, 612a, and 612b are shown in FIGS. 6A-6F, the fourth panoramic camera 600 may be configured to shift to other sensor positions within the range between the second and third sensor positions 612a and 614a. In some examples, the mechanical shifting of the image sensors 238a and 238b may be performed as a manual operation, such as by turning a knob mechanically coupled to one or more lead screws that shift the image sensors 238a and 238b. In some examples, the mechanical shifting of the image sensors 238a and 238b may be performed electronically (for example, using an electromechanical actuator) in response to a user command. For example, a user command may cause a motor to shift the sensor positions. In some examples, the mechanical shifting of the image sensors 238a and 238b may be performed electronically automatically under software control by the fourth panoramic camera 600. For example, the fourth panoramic camera 600 may be configured to automatically identify situations in which there is an issue with a current VFOV (for example, by performing face tracking) and in response automatically shift the sensor positions to an improved VFOV.

Figure 7A:
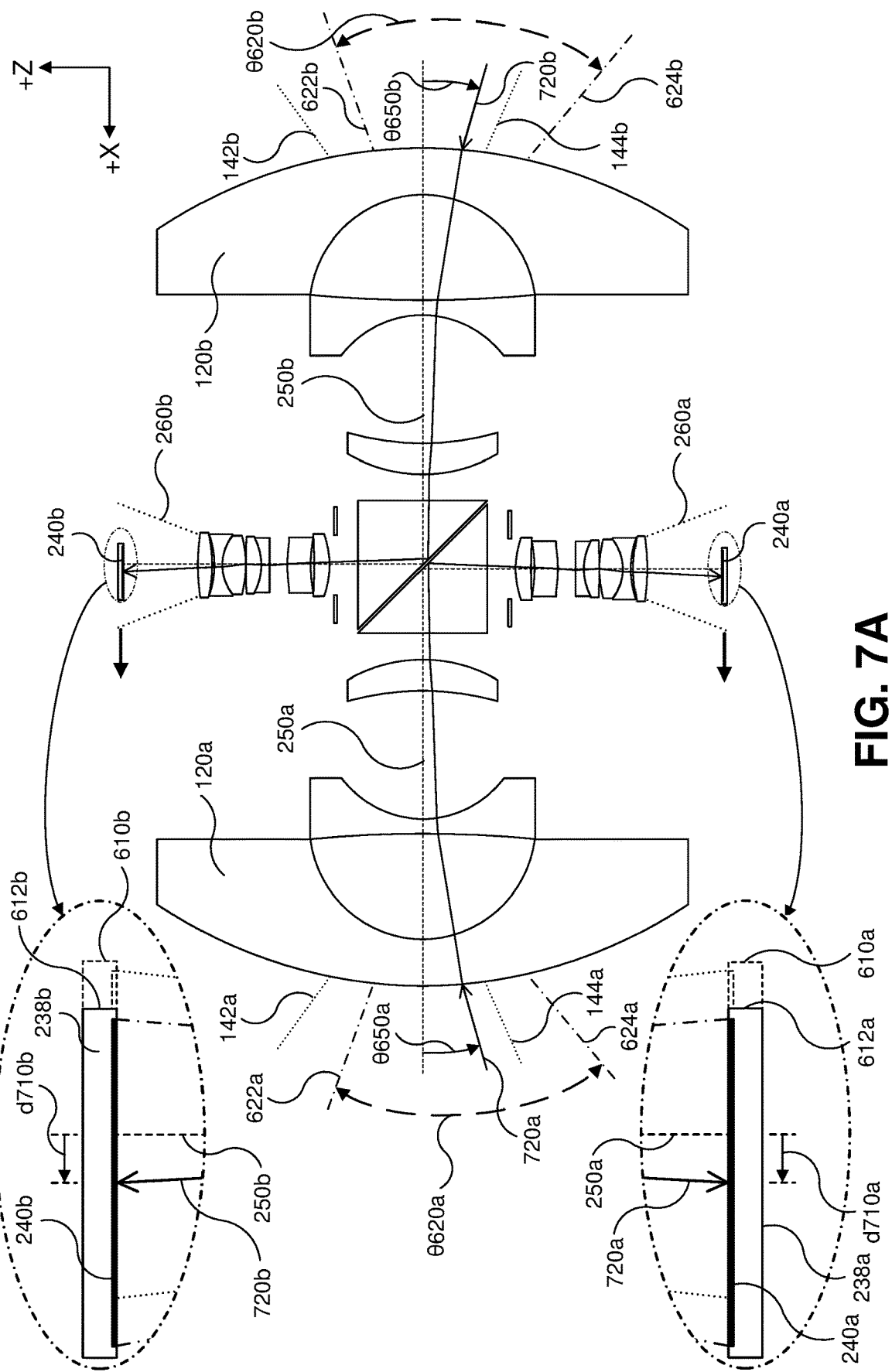
FIGS. 7A and 7B illustrate examples in which the VFOV changes shown in FIGS. 6C-6F are performed by the second panoramic camera shown in FIG. 2A or FIG. 2B.
Figure 7B:
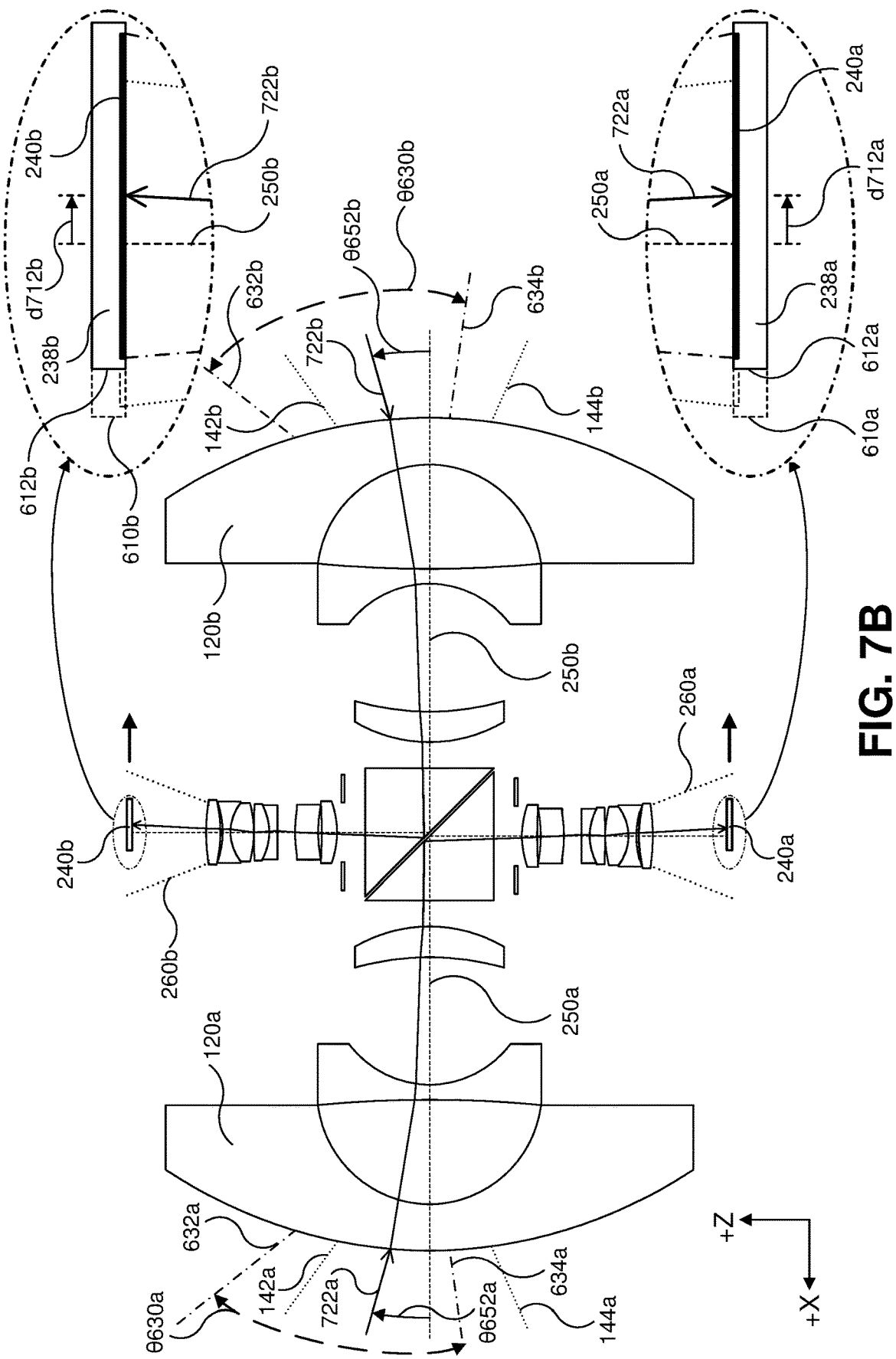

FIGS. 7A and 7B illustrates an example in which the VFOV changes shown in FIGS. 6C-6F are performed by the second panoramic camera 200 shown in FIG. 2A or FIG. 2B. In FIG. 7A, the first image sensor 238a and the second image sensor 238b have been shifted together in the positive lateral direction (along the X axis in the positive direction), as shown in FIGS. 6C and 6D. The first image sensor 238a (including the first imaging surface 240a) was shifted a distance d710a with the first imaging surface 240a being perpendicular to the chief ray 250a of the first lens 120a, and as a result the VFOV of the first imaging surface 240a (and its effective optical axis 720a) moved downward by an angle θ650a by the view camera effect described in connection with FIG. 2A. Similarly, the second image sensor 238b (including the second imaging surface 240b) was shifted a distance d710b with the second imaging surface 240b being perpendicular to the chief ray 250b of the second lens 120a, and as a result the VFOV of the second imaging surface 240b (and its effective optical axis 720b) moved downward by an angle θ650b. In some examples, the distances d710a and d710b are equal or approximately equal, and/or the angles 650a and 650b are equal or approximately equal.

In FIG. 7B, the first image sensor 238a and the second image sensor 238b have been shifted together in the negative lateral direction (along the X axis in the negative direction), as shown in FIGS. 6E and 6F. The first image sensor 238a was shifted a distance d712a, and as a result the VFOV of the first imaging surface 240a (and its effective optical axis 720a) moved upward by an angle θ652a. Similarly, the second image sensor 238b was shifted a distance d712b, and as a result the VFOV of the second imaging surface 240b (and its effective optical axis 720b) moved upward by an angle θ652b. In some examples, the distances d712a and d712b are equal or approximately equal, and/or the angles 652a and 652b are equal or approximately equal.

Figure 8A:
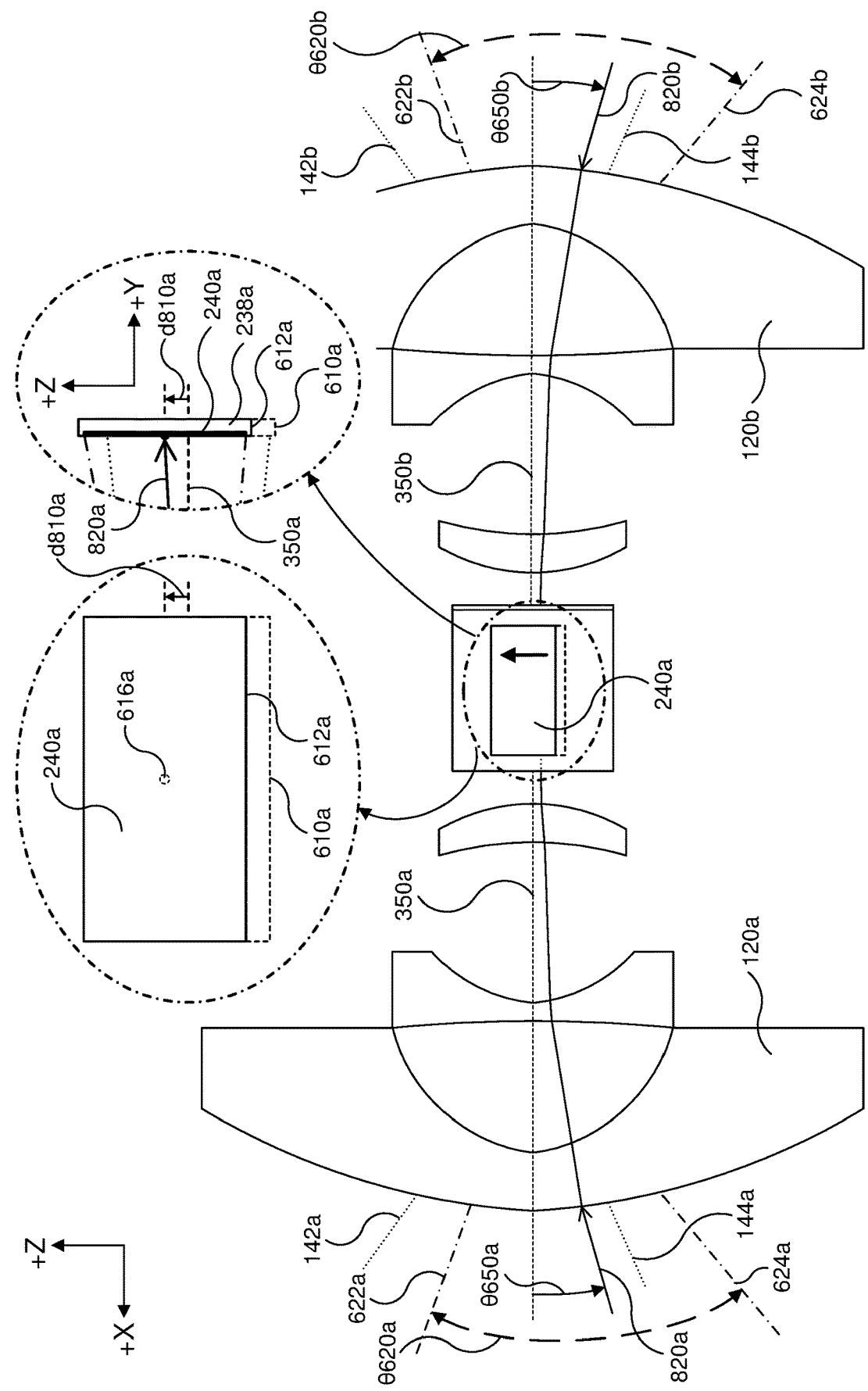
FIGS. 8A and 8B illustrate examples in which the VFOV changes shown in FIGS. 6C-6F are performed by the third panoramic camera shown in FIG. 3A or FIG. 3B.
Figure 8B:
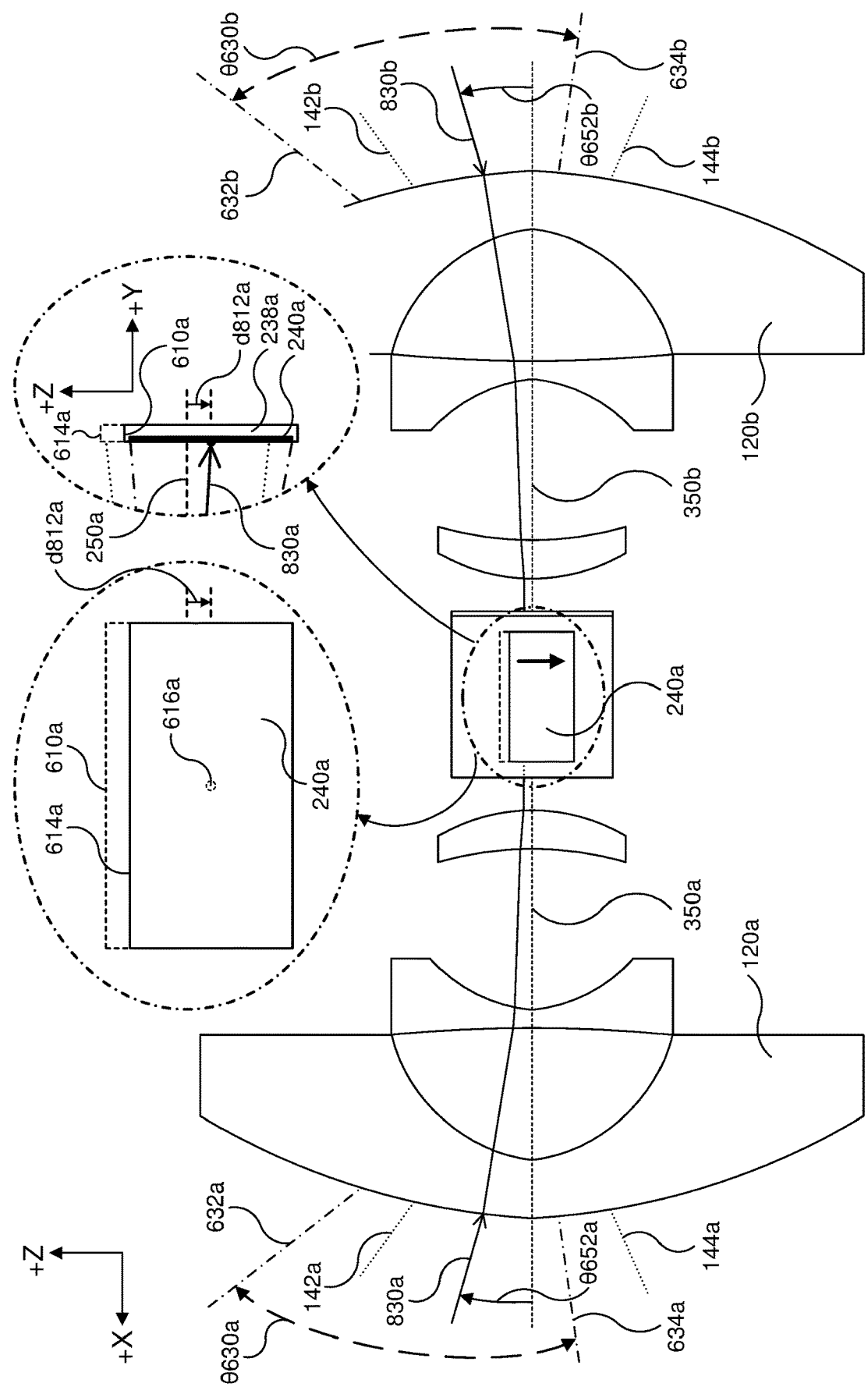

FIGS. 8A and 8B illustrates an example in which the VFOV changes shown in FIGS. 6C-6F are performed by the third panoramic camera 300 shown in FIG. 3A or FIG. 3B. In FIG. 8A, the first image sensor 238a and the second image sensor 238b have been shifted together in the positive lateral direction (along the Z axis in the positive direction), as shown in FIGS. 6C and 6D. The first image sensor 238a (including the first imaging surface 240a) was shifted a distance d810a with the first imaging surface 240a being perpendicular to the chief ray 350a of the first lens 120a, and as a result the VFOV of the first imaging surface 240a (and its effective optical axis 820a) moved downward by the angle θ650a by the view camera effect described in connection with FIG. 2A. Similarly, the second image sensor 238b (including the second imaging surface 240b) was shifted a distance d810b with the second imaging surface 240b being perpendicular to the chief ray 250b of the second lens 120a, and as a result the VFOV of the second imaging surface 240b (and its effective optical axis 820b) moved downward by the angle θ650b. In some examples, the distances d810a and d810b are equal or approximately equal, and/or the angles 650a and 650b are equal or approximately equal.

In FIG. 8B, the first image sensor 238a and the second image sensor 238b have been shifted together in the negative lateral direction (along the Z axis in the negative direction), as shown in FIGS. 6E and 6F. The first image sensor 238a was shifted a distance d812a, and as a result the VFOV of the first imaging surface 240a (and its effective optical axis 820a) moved upward by the angle θ652a. Similarly, the second image sensor 238b was shifted a distance d812b, and as a result the VFOV of the second imaging surface 240b (and its effective optical axis 820b) moved upward by the angle θ652b. In some examples, the distances d812a and d812b are equal or approximately equal, and/or the angles 652a and 652b are equal or approximately equal.

In some of the above examples, there is a reduction in vertical field of view for a 2× increase in resolution (4× pixels) allowing all requirements for a 360-degree conference room device to be met at a reduced cost and with higher resolution than previous two-sensor approaches. In some implementations, for each of FIGS. 2A, 2B, 3A, 3B, 6A-6F, 7A-7B and 8A-8B, the illustrated features may be mounted within and/or to a common enclosure, much as shown in connection with the enclosure 110 in FIGS. 1A-1F.

Figure 9:
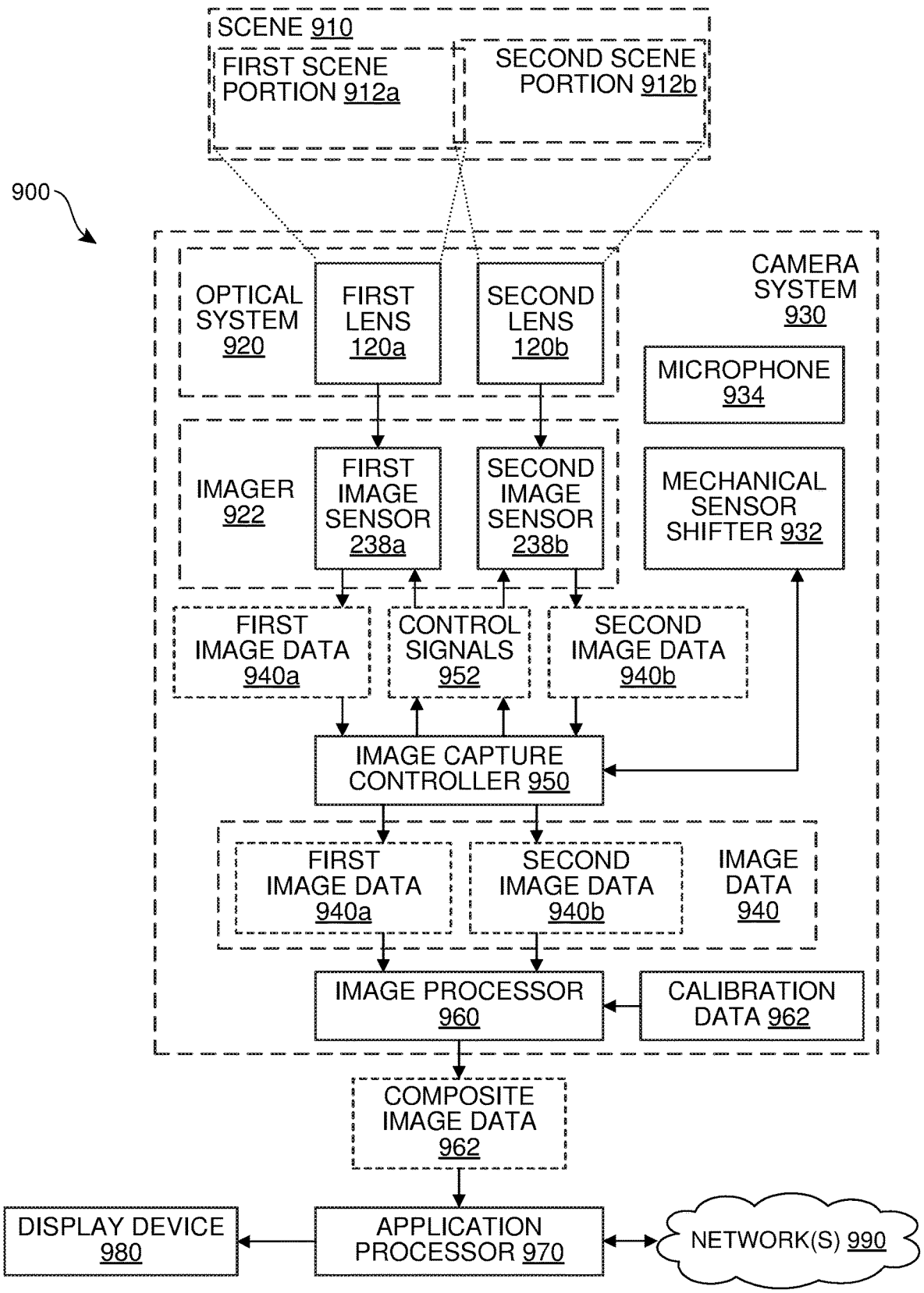
FIG. 9 is a block diagram illustrating an example 360-degree camera system.

FIG. 9 is a block diagram 900 illustrating an example 360-degree camera system 930, which may include any of the features described herein. The 360-degree camera system 930 may be referred to as a "camera system", "imaging system", "image capture system", "camera", or "panoramic camera system." The camera system 930 includes an optical system 920 configured to receive and guide light from a scene 900 (which may be referred to as an "environment"). The optical system 920 includes the first lens 120a and the second lens 120b, according to any of the previous examples, which are arranged in opposing directions to capture, respectively, a first scene portion 912a and second scene portion 912b of the scene 910. Together, the first lens 120a and the second lens 120b capture a total HFOV of at least 360 degrees. In some implementations, the first lens 120a and the second lens 120b each have an HFOV greater than 180 degrees and the scene portions 912a and 912b overlap.

The camera system 930 further includes an imager 922 arranged to receive image formation light flux guided by the optical system 920, and capture corresponding image data 940. The imager includes the first image sensor 238a arranged to receive image formation light flux guided by the first lens 120a and the second image sensor 238b arranged to receive image formation light flux guided by the second lens 120b. The camera system 930 includes an image capture controller 950 that is configured to generate and provide control signals 952 to the imager 922, which cause the imager 922 to capture and provide the image data 940. The first image sensor 238a provides a first image data 940a corresponding to the first scene portion 912a and the second image sensor 238b provides a second image data 940b corresponding to the second scene portion 912b. The image capture controller 950 is configured to synchronize capture of image data by the image sensors 238a and 238b, such that first image frames captured by each image sensor 238a and 238b will have been captured at approximately the same time, second image frames captured by each image sensor 238a and 238b will have been captured at approximately the same time, and so on.

In some implementations, the image capture controller 950 is configured to cause the image sensors 238a and 238b to capture image frames at a selected frame rate between 5 and 150 frames per second. For example, frame rates of 30 or 60 frames per second are commonly used for video capture, video streaming, and/or video conferencing. In some implementations, the camera system 930 includes a mechanical sensor shifter 932 configured to mechanically shift a relative positioning of the imager 922 and the optical system 920 to shift a VFOV captured by the imager 922 by a selected amount, as described in connection with FIGS. 6A-8B. In some implementations, the mechanical sensor shifter 932 is configured to perform the mechanical shifting electronically and the image capture controller 950 is configured to generate control signals (not shown in FIG. 9) causing a selected amount of shifting.

In the example shown in FIG. 9, the camera system 930 includes an image processor 960 configured to receive the image data 940 and generate corresponding composite image data 962. For each corresponding pair of image frames (captured at approximately the same time) included in the image data 940a and 940b, the image processor 960 is configured to generate a respective composite image frame based on both the first image data 940a and the second image data 940b. In some examples, the composite image frame has an HFOV of 360 degrees (and may be referred to as a "360-degree image"). A composite image may also be referred to as a "panoramic image." The camera system 930 stores in a memory (not shown in FIG. 9) calibration data 962 used by the image processor 960 for operations such as distortion correction, color correction, temperature-based image corrections (for which a temperature sensor may be included in the camera system 930 to obtain a current temperature of the camera system 930, and which may include color correction and/or obtaining corresponding image remapping parameters), and/or remapping the image data 940a and 940b (which may be based on the temperature-based image remapping parameters) to form the composite image data 962. In some implementations, an amount of mechanical shifting performed using the mechanical shifter sensor 932 is obtained by the image processor 960 and used to generate the composite image data 962; for example, remapping of the image data 940a and 940b will generally depend on the VFOV corresponding to the amount of shift.

The camera system 930 provides the composite image data 962 to an application processor 970 configured to process and make use of the composite image data 962. In some implementations, the application processor 970, or a portion thereof, is included in the camera system 930. In some examples, the application processor 970, or a portion thereof, is included in a computing system separate from and communicatively coupled to the camera system 930, with the composite image data 962 provided to the computing system via a data communication link such as a network or USB connection. In some examples, the application processor 970 is configured to perform teleconferencing operations based on the composite image data 962 and, in some examples, audio data obtained via a microphone 934 included in the camera system 930. Such teleconferencing operations may include, for example, generating a video stream for transmission via network(s) 990 to another computing system, receiving a video stream from another computing system, and/or presenting the received video stream on a display device 980.

The detailed examples of systems, devices, and techniques described in connection with FIGS. 1-9 are presented herein for illustration of the disclosure and its benefits. Such examples of use should not be construed to be limitations on the logical process implementations of the disclosure, nor should variations of user interface methods from those described herein be considered outside the scope of the present disclosure. In some implementations, various features described in FIGS. 1-9 are implemented in respective modules, which may also be referred to as, and/or include, logic, components, units, and/or mechanisms. Modules may constitute either software modules (for example, code embodied on a machine-readable medium) or hardware modules.

In some examples, a hardware module may be implemented mechanically, electronically, or with any suitable combination thereof. For example, a hardware module may include dedicated circuitry or logic that is configured to perform certain operations. For example, a hardware module may include a special-purpose processor, such as a field-programmable gate array (FPGA) or an Application Specific Integrated Circuit (ASIC). A hardware module may also include programmable logic or circuitry that is temporarily configured by software to perform certain operations, and may include a portion of machine-readable medium data and/or instructions for such configuration. For example, a hardware module may include software encompassed within a programmable processor configured to execute a set of software instructions. It will be appreciated that the decision to implement a hardware module mechanically, in dedicated and permanently configured circuitry, or in temporarily configured circuitry (for example, configured by software) may be driven by cost, time, support, and engineering considerations.

Accordingly, the phrase "hardware module" should be understood to encompass a tangible entity capable of performing certain operations and may be configured or arranged in a certain physical manner, be that an entity that is physically constructed, permanently configured (for example, hardwired), and/or temporarily configured (for example, programmed) to operate in a certain manner or to perform certain operations described herein. As used herein, "hardware-implemented module" refers to a hardware module. Considering examples in which hardware modules are temporarily configured (for example, programmed), each of the hardware modules need not be configured or instantiated at any one instance in time. For example, where a hardware module includes a programmable processor configured by software to become a special-purpose processor, the programmable processor may be configured as respectively different special-purpose processors (for example, including different hardware modules) at different times. Software may accordingly configure a particular processor or processors, for example, to constitute a particular hardware module at one instance of time and to constitute a different hardware module at a different instance of time. A hardware module implemented using one or more processors may be referred to as being "processor implemented" or "computer implemented."

Hardware modules can provide information to, and receive information from, other hardware modules. Accordingly, the described hardware modules may be regarded as being communicatively coupled. Where multiple hardware modules exist contemporaneously, communications may be achieved through signal transmission (for example, over appropriate circuits and buses) between or among two or more of the hardware modules. In implementations in which multiple hardware modules are configured or instantiated at different times, communications between such hardware modules may be achieved, for example, through the storage and retrieval of information in memory devices to which the multiple hardware modules have access. For example, one hardware module may perform an operation and store the output in a memory device, and another hardware module may then access the memory device to retrieve and process the stored output.

In some examples, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by, and/or among, multiple computers (as examples of machines including processors), with these operations being accessible via a network (for example, the Internet) and/or via one or more software interfaces (for example, an application program interface (API)). The performance of certain of the operations may be distributed among the processors, not only residing within a single machine, but deployed across a number of machines. Processors or processor-implemented modules may be located in a single geographic location (for example, within a home or office environment, or a server farm), or may be distributed across multiple geographic locations.

Figure 10:
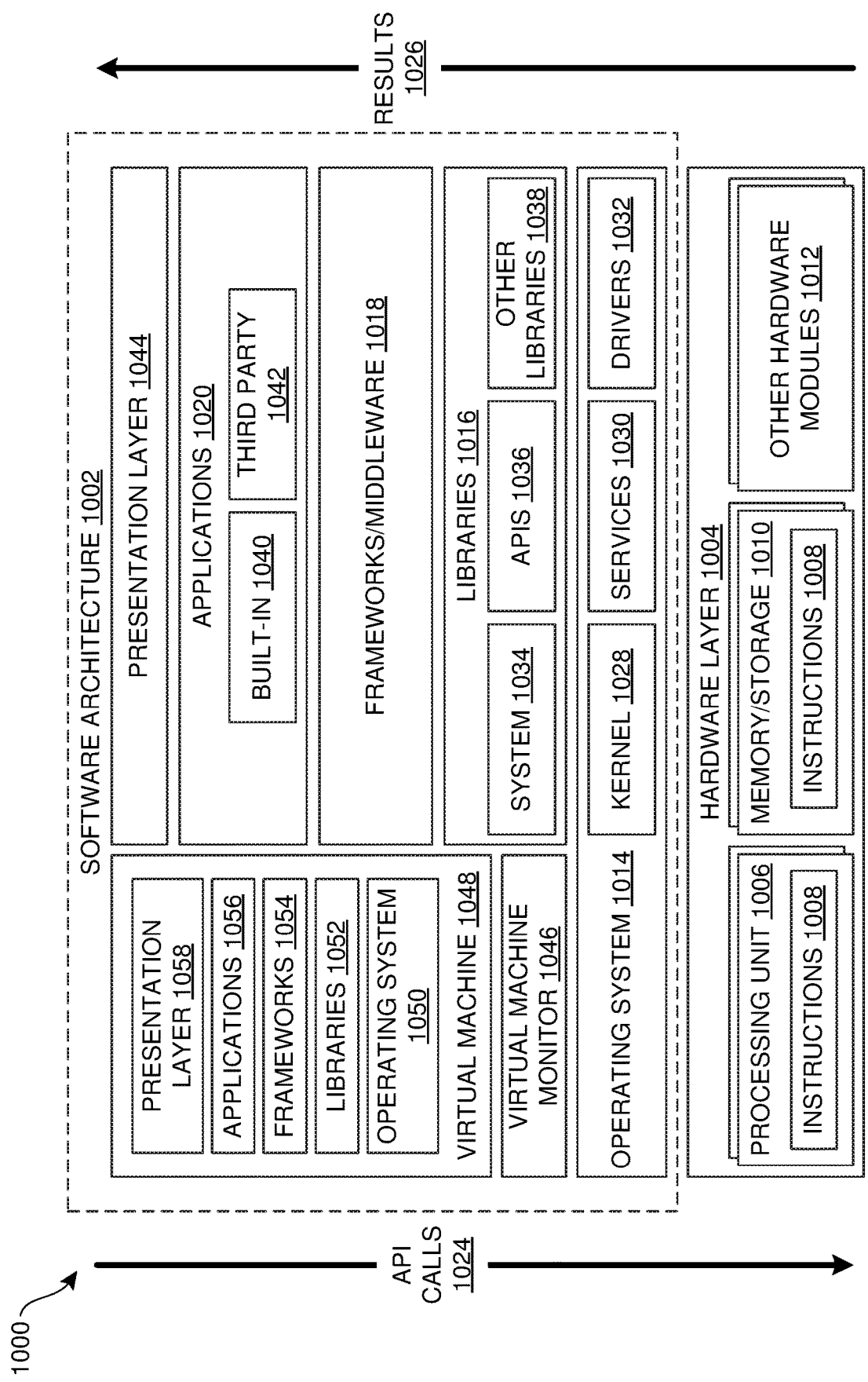
FIG. 10 is a block diagram of an example computing device, which may be used to provide implementations of the mechanisms described herein.

FIG. 10 is a block diagram 1000 illustrating an example software architecture 1002, various portions of which may be used in conjunction with various hardware architectures herein described, which may implement any of the above-described features. FIG. 10 is a non-limiting example of a software architecture and it will be appreciated that many other architectures may be implemented to facilitate the functionality described herein. The software architecture 1002 may execute on hardware such as a device that includes, among other things, document storage, processors, memory, and input/output (I/O) components. The representative hardware layer 1004 includes a processing unit 1006 and associated executable instructions 1008. The executable instructions 1008 represent executable instructions of the software architecture 1002, including implementation of the methods, modules and so forth described herein. The hardware layer 1004 also includes a memory/storage 1010, which also includes the executable instructions 1008 and accompanying data. The hardware layer 1004 may also include other hardware modules 1012. Instructions 1008 held by processing unit 1008 may be portions of instructions 1008 held by the memory/storage 1010.

The example software architecture 1002 may be conceptualized as layers, each providing various functionality. For example, the software architecture 1002 may include layers and components such as an operating system (OS) 1014, libraries 1016, frameworks 1018, applications 1020, and a presentation layer 1044. Operationally, the applications 1020 and/or other components within the layers may invoke API calls 1024 to other layers and receive corresponding results 1026. The layers illustrated are representative in nature and other software architectures may include additional or different layers. For example, some mobile or special purpose operating systems may not provide the frameworks/middleware 1018.

The OS 1014 may manage hardware resources and provide common services. The OS 1014 may include, for example, a kernel 1028, services 1030, and drivers 1032. The kernel 1028 may act as an abstraction layer between the hardware layer 1004 and other software layers. For example, the kernel 1028 may be responsible for memory management, processor management (for example, scheduling), component management, networking, security settings, and so on. The services 1030 may provide other common services for the other software layers. The drivers 1032 may be responsible for controlling or interfacing with the underlying hardware layer 1004. For instance, the drivers 1032 may include display drivers, camera drivers, memory/storage drivers, peripheral device drivers (for example, via Universal Serial Bus (USB)), network and/or wireless communication drivers, audio drivers, and so forth depending on the hardware and/or software configuration.

The libraries 1016 may provide a common infrastructure that may be used by the applications 1020 and/or other components and/or layers. The libraries 1016 typically provide functionality for use by other software modules to perform tasks, rather than rather than interacting directly with the OS 1014. The libraries 1016 may include system libraries 1034 (for example, C standard library) that may provide functions such as memory allocation, string manipulation, file operations. In addition, the libraries 1016 may include API libraries 1036 such as media libraries (for example, supporting presentation and manipulation of image, sound, and/or video data formats), graphics libraries (for example, an OpenGL library for rendering 2D and 3D graphics on a display), database libraries (for example, SQLite or other relational database functions), and web libraries (for example, WebKit that may provide web browsing functionality). The libraries 1016 may also include a wide variety of other libraries 1038 to provide many functions for applications 1020 and other software modules.

The frameworks 1018 (also sometimes referred to as middleware) provide a higher-level common infrastructure that may be used by the applications 1020 and/or other software modules. For example, the frameworks 1018 may provide various graphic user interface (GUI) functions, high-level resource management, or high-level location services. The frameworks 1018 may provide a broad spectrum of other APIs for applications 1020 and/or other software modules.

The applications 1020 include built-in applications 1040 and/or third-party applications 1042. Examples of built-in applications 1040 may include, but are not limited to, a contacts application, a browser application, a location application, a media application, a messaging application, and/or a game application. Third-party applications 1042 may include any applications developed by an entity other than the vendor of the particular platform. The applications 1020 may use functions available via OS 1014, libraries 1016, frameworks 1018, and presentation layer 1044 to create user interfaces to interact with users.

Some software architectures use virtual machines, as illustrated by a virtual machine 1048. The virtual machine 1048 provides an execution environment where applications/modules can execute as if they were executing on a hardware machine (such as the machine 1100 of FIG. 11, for example). The virtual machine 1048 may be hosted by a host OS (for example, OS 1014) or hypervisor, and may have a virtual machine monitor 1046 which manages operation of the virtual machine 1048 and interoperation with the host operating system. A software architecture, which may be different from software architecture 1002 outside of the virtual machine, executes within the virtual machine 1048 such as an OS 1050, libraries 1052, frameworks 1054, applications 1056, and/or a presentation layer 1058.

Figure 11:
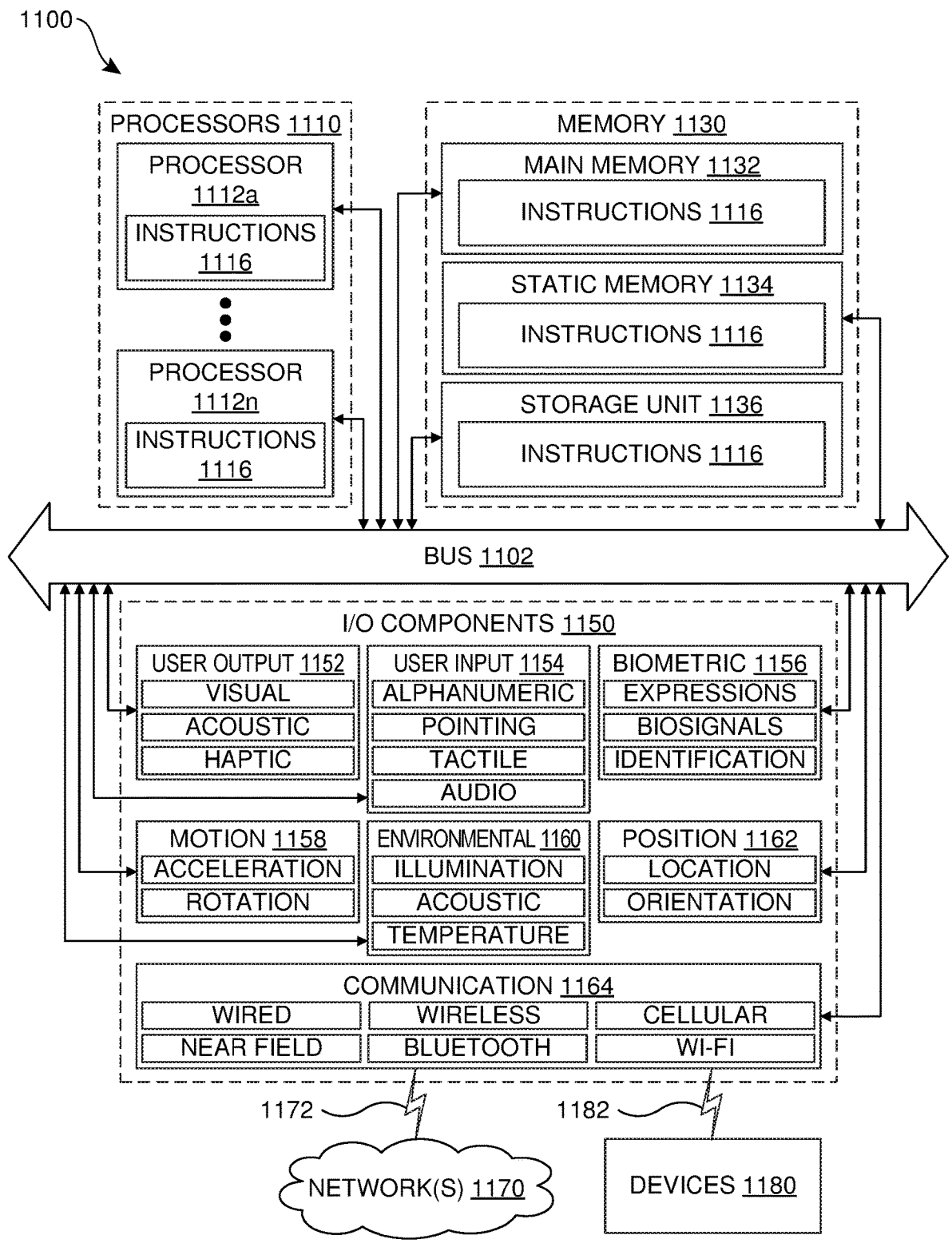
FIG. 11 is a block diagram illustrating components of an example machine configured to read instructions from a machine-readable medium.

FIG. 11 is a block diagram illustrating components of an example machine 1100 configured to read instructions from a machine-readable medium (for example, a machine-readable storage medium) and perform any of the features described herein. The example machine 1100 is in a form of a computer system, within which instructions 1116 (for example, in the form of software components) for causing the machine 1100 to perform any of the features described herein may be executed. As such, the instructions 1116 may be used to implement modules or components described herein. The instructions 1116 cause unprogrammed and/or unconfigured machine 1100 to operate as a particular machine configured to carry out the described features. The machine 1100 may be configured to operate as a standalone device or may be coupled (for example, networked) to other machines. In a networked deployment, the machine 1100 may operate in the capacity of a server machine or a client machine in a server-client network environment, or as a node in a peer-to-peer or distributed network environment. Machine 1100 may be embodied as, for example, a server computer, a client computer, a personal computer (PC), a tablet computer, a laptop computer, a netbook, a set-top box (STB), a gaming and/or entertainment system, a smart phone, a mobile device, a wearable device (for example, a smart watch), and an Internet of Things (IoT) device. Further, although only a single machine 1100 is illustrated, the term "machine" include a collection of machines that individually or jointly execute the instructions 1116.

The machine 1100 may include processors 1110, memory 1130, and I/O components 1150, which may be communicatively coupled via, for example, a bus 1102. The bus 1102 may include multiple buses coupling various elements of machine 1100 via various bus technologies and protocols. In an example, the processors 1110 (including, for example, a central processing unit (CPU), a graphics processing unit (GPU), a digital signal processor (DSP), an ASIC, or a suitable combination thereof) may include one or more processors 1112a to 1112n that may execute the instructions 1116 and process data. In some examples, one or more processors 1110 may execute instructions provided or identified by one or more other processors 1110. The term "processor" includes a multi-core processor including cores that may execute instructions contemporaneously. Although FIG. 11 shows multiple processors, the machine 1100 may include a single processor with a single core, a single processor with multiple cores (for example, a multi-core processor), multiple processors each with a single core, multiple processors each with multiple cores, or any combination thereof. In some examples, the machine 1100 may include multiple processors distributed among multiple machines.

The memory/storage 1130 may include a main memory 1132, a static memory 1134, or other memory, and a storage unit 1136, both accessible to the processors 1110 such as via the bus 1102. The storage unit 1136 and memory 1132, 1134 store instructions 1116 embodying any one or more of the functions described herein. The memory/storage 1130 may also store temporary, intermediate, and/or long-term data for processors 1110. The instructions 1116 may also reside, completely or partially, within the memory 1132, 1134, within the storage unit 1136, within at least one of the processors 1110 (for example, within a command buffer or cache memory), within memory at least one of I/O components 1150, or any suitable combination thereof, during execution thereof. Accordingly, the memory 1132, 1134, the storage unit 1136, memory in processors 1110, and memory in I/O components 1150 are examples of machine-readable media.

As used herein, "machine-readable medium" refers to a device able to temporarily or permanently store instructions and data that cause machine 1100 to operate in a specific fashion. The term "machine-readable medium," as used herein, does not encompass transitory electrical or electromagnetic signals per se (such as on a carrier wave propagating through a medium); the term "machine-readable medium" may therefore be considered tangible and non-transitory. Non-limiting examples of a non-transitory, tangible machine-readable medium may include, but are not limited to, nonvolatile memory (such as flash memory or read-only memory (ROM)), volatile memory (such as a static random-access memory (RAM) or a dynamic RAM), buffer memory, cache memory, optical storage media, magnetic storage media and devices, network-accessible or cloud storage, other types of storage, and/or any suitable combination thereof. The term "machine-readable medium" applies to a single medium, or combination of multiple media, used to store instructions (for example, instructions 1116) for execution by a machine 1100 such that the instructions, when executed by one or more processors 1110 of the machine 1100, cause the machine 1100 to perform and one or more of the features described herein. Accordingly, a "machine-readable medium" may refer to a single storage device, as well as "cloud-based" storage systems or storage networks that include multiple storage apparatus or devices.

The I/O components 1150 may include a wide variety of hardware components adapted to receive input, provide output, produce output, transmit information, exchange information, capture measurements, and so on. The specific I/O components 1150 included in a particular machine will depend on the type and/or function of the machine. For example, mobile devices such as mobile phones may include a touch input device, whereas a headless server or IoT device may not include such a touch input device. The particular examples of I/O components illustrated in FIG. 11 are in no way limiting, and other types of components may be included in machine 1100. The grouping of I/O components 1150 are merely for simplifying this discussion, and the grouping is in no way limiting. In various examples, the I/O components 1150 may include user output components 1152 and user input components 1154. User output components 1152 may include, for example, display components for displaying information (for example, a liquid crystal display (LCD) or a projector), acoustic components (for example, speakers), haptic components (for example, a vibratory motor or force-feedback device), and/or other signal generators. User input components 1154 may include, for example, alphanumeric input components (for example, a keyboard or a touch screen), pointing components (for example, a mouse device, a touchpad, or another pointing instrument), and/or tactile input components (for example, a physical button or a touch screen that provides location and/or force of touches or touch gestures) configured for receiving various user inputs, such as user commands and/or selections.

In some examples, the I/O components 1150 may include biometric components 1156 and/or position components 1162, among a wide array of other environmental sensor components. The biometric components 1156 may include, for example, components to detect body expressions (for example, facial expressions, vocal expressions, hand or body gestures, or eye tracking), measure biosignals (for example, heart rate or brain waves), and identify a person (for example, via voice-, retina-, and/or facial-based identification). The position components 1162 may include, for example, location sensors (for example, a Global Position System (GPS) receiver), altitude sensors (for example, an air pressure sensor from which altitude may be derived), and/or orientation sensors (for example, magnetometers).

The I/O components 1150 may include communication components 1164, implementing a wide variety of technologies operable to couple the machine 1100 to network(s) 1170 and/or device(s) 1180 via respective communicative couplings 1172 and 1182. The communication components 1164 may include one or more network interface components or other suitable devices to interface with the network(s) 1170. The communication components 1164 may include, for example, components adapted to provide wired communication, wireless communication, cellular communication, Near Field Communication (NFC), Bluetooth communication, Wi-Fi, and/or communication via other modalities. The device(s) 1180 may include other machines or various peripheral devices (for example, coupled via USB).

In some examples, the communication components 1164 may detect identifiers or include components adapted to detect identifiers. For example, the communication components 1164 may include Radio Frequency Identification (RFID) tag readers, NFC detectors, optical sensors (for example, one- or multi-dimensional bar codes, or other optical codes), and/or acoustic detectors (for example, microphones to identify tagged audio signals). In some examples, location information may be determined based on information from the communication components 1162, such as, but not limited to, geo-location via Internet Protocol (IP) address, location via Wi-Fi, cellular, NFC, Bluetooth, or other wireless station identification and/or signal triangulation.

The disclosed implementations can incorporate any of the features, components, methods, systems, software, and other aspects, such as but not limited to those relating to panoramic cameras, warping and stitching multiple images to obtain panoramic image data, and videoconferencing, described in U.S. Patent Application Publication Numbers 2004/0233274 (entitled "Panoramic video" and published on Nov. 25, 2004); 2005/0117015 (entitled "Foveated panoramic camera system" and published on Jun. 2, 2005); 2005/0117034 (entitled "Temperature compensation in multi-camera photographic devices" and published on Jun. 2, 2005); 2005/0151837 (entitled "Minimizing dead zones in panoramic images" and published on Jul. 14, 2005); 2005/0206659 (entitled "User interface for a system and method for head size equalization in 360 degree panoramic images" and published on Sep. 22, 2005); 2005/0280700 (entitled "Automated online broadcasting system and method using an omni-directional camera system for viewing meetings over a computer network" and published on Dec. 22, 2005); 2005/0285933 (entitled "Automated online broadcasting system and method using an omni-directional camera system for viewing meetings over a computer network" and published on Dec. 29, 2005); 2006/0023075 (entitled "Maintenance of panoramic camera orientation" and published on Feb. 2, 2006); 2006/0023106 (entitled "Multi-view integrated camera system" and published on Feb. 2, 2006); 2006/0146177 (entitled "Camera lens shuttering mechanism" and published on Jul. 6, 2006); 2006/0164552 (entitled "Embedding a panoramic image in a video stream" and published on Jul. 27, 2006); 2006/0268131 (entitled "System and method for camera calibration and images stitching" and published on Nov. 30, 2006); 2007/0019066 (entitled "Normalized images for cameras" and published on Jan. 25, 2007); 2007/0058879 (entitled "Automatic detection of panoramic camera position and orientation table parameters" and published on Mar. 15, 2007); 2007/0299912 (entitled "PANORAMIC VIDEO IN A LIVE MEETING CLIENT" and published on Dec. 27, 2007); 2008/0002023 (entitled "Parametric calibration for panoramic camera systems" and published on Jan. 3, 2008); 2012/0075407 (entitled "TWO-WAY VIDEO CONFERENCING SYSTEM" and published on Mar. 29, 2012); 2012/0154513 (entitled "VIRTUAL CIRCULAR CONFERENCING EXPERIENCE USING UNIFIED COMMUNICATION TECHNOLOGY" and published on Jun. 21, 2012); 2012/0154519 (entitled "CHASSIS ASSEMBLY FOR 360-DEGREE STEREOSCOPIC VIDEO CAPTURE" and published on Jun. 21, 2012); 2012/0155786 (entitled "SEAMLESS LEFT/RIGHT VIEWS FOR 360-DEGREE STEREOSCOPIC VIDEO" and published on Jun. 21, 2012); 2012/0162362 (entitled "MAPPING SOUND SPATIALIZATION FIELDS TO PANORAMIC VIDEO" and published on Jun. 28, 2012); 2012/0314015 (entitled "TECHNIQUES FOR MULTIPLE VIDEO SOURCE STITCHING IN A CONFERENCE ROOM" and published on Dec. 13, 2012); 2014/0168357 (entitled "DISPLACING IMAGE ON IMAGER IN MULTI-LENS CAMERAS" and published on Jun. 19, 2014); 2014/0168475 (entitled "FOUR-LENS SPHERICAL CAMERA ORIENTATION" and published on Jun. 19, 2014); 2017/0085861 (entitled "OMNI-DIRECTIONAL CAMERA" and published on Mar. 23, 2017); 2017/0111579 (entitled "OMNIDIRECTIONAL CAMERA WITH MOVEMENT DETECTION" and published on Apr. 20, 2017); 2017/0127008 (entitled "TRACKING OBJECT OF INTEREST IN AN OMNIDIRECTIONAL VIDEO" and published on May 4, 2017); 2017/0134714 (entitled "DEVICE AND METHOD FOR CREATING VIDEOCLIPS FROM OMNIDIRECTIONAL VIDEO" and published on May 11, 2017); 2017/0269820 (entitled "SELECTABLE INTERACTION ELEMENTS IN A VIDEO STREAM" and published on Sep. 21, 2017); 2017/0270633 (entitled "BOWTIE VIEW REPRESENTING A 360-DEGREE IMAGE" and published on Sep. 21, 2017); 2017/0272263 (entitled "ACTION(S) BASED ON AUTOMATIC PARTICIPANT IDENTIFICATION" and published on Sep. 21, 2017); 2018/0152663 (entitled "VIEW-DEPENDENT OPERATIONS DURING PLAYBACK OF PANORAMIC VIDEO" and published on May 31, 2018); 2018/0152682 (entitled "RE-PROJECTING FLAT PROJECTIONS OF PICTURES OF PANORAMIC VIDEO FOR RENDERING BY APPLICATION" and published on May 31, 2018); and 2018/0174619 (entitled "INTERFACE FOR APPLICATION-SPECIFIED PLAYBACK OF PANORAMIC VIDEO" and published on Jun. 21, 2018), each of which is incorporated by reference herein in their entireties.

The disclosed implementations can incorporate any of the features, components, methods, systems, software, and other aspects described in U.S. Pat. No. 8,803,944 (entitled "Controller in a camera for creating a registered video image" and issued on Aug. 12, 2014); U.S. Pat. No. 9,992,414 (entitled "Imaging system" and issued on Jun. 5, 2018); and U.S. Pat. No. 10,181,178 (entitled "Privacy image generation system" and issued on Jan. 15, 2019), and U.S. Patent Application Publication Numbers 2004/0263636 (entitled "System and method for distributed meetings" and published on Dec. 30, 2004); 2004/0263646 (entitled "Whiteboard view camera" and published on Dec. 30, 2004); 2005/0201616 (entitled "High-quality gradient-corrected linear interpolation for demosaicing of color images" and published on Sep. 15, 2005); 2005/0265562 (entitled "System and process for locating a speaker using 360 degree sound source localization" and published on Dec. 1, 2005); 2006/0033999 (entitled "Real-time wide-angle image correction system and method for computer image viewing" and published on Feb. 16, 2006); 2007/0269105 (entitled "System and Method for Whiteboard and Audio Capture" and published on Nov. 22, 2007); 2008/0144968 (entitled "DYNAMIC VIEWING OF WIDE ANGLE IMAGES" and published on Jun. 19, 2008); 2008/0255840 (entitled "Video Nametags" and published on Oct. 16, 2008); 2009/0002476 (entitled "MICROPHONE ARRAY FOR A CAMERA SPEAKERPHONE" and published on Jan. 1, 2009); 2009/0002477 (entitled "CAPTURE DEVICE MOVEMENT COMPENSATION FOR SPEAKER INDEXING" and published on Jan. 1, 2009); 2009/0046139 (entitled "SYSTEM AND METHOD FOR DISTRIBUTED MEETINGS" and published on Feb. 19, 2009); 2009/0210491 (entitled "TECHNIQUES TO AUTOMATICALLY IDENTIFY PARTICIPANTS FOR A MULTIMEDIA CONFERENCE EVENT" and published on Aug. 20, 2009); 2009/0322915 (entitled "Speaker and Person Backlighting For Improved AEC and AGC" and published on Dec. 31, 2009); 2010/0092007 (entitled "Dynamic Switching of Microphone Inputs for Identification of a Direction of a Source of Speech Sounds" and published on Apr. 15, 2010); 2010/0315482 (entitled "Interest Determination For Auditory Enhancement" and published on Dec. 16, 2010); 2010/0324891 (entitled "MUTE CONTROL IN AUDIO ENDPOINTS" and published on Dec. 23, 2010); 2012/0133780 (entitled "CAMERA CALIBRATION WITH LENS DISTORTION FROM LOW-RANK TEXTURES" and published on May 31, 2012); 2012/0218371 (entitled "Satellite Microphone Array for Video Conferencing" and published on Aug. 30, 2012); 2012/0262536 (entitled "STEREOPHONIC TELECONFERENCING USING A MICROPHONE ARRAY" and published on Oct. 18, 2012); 2012/0278077 (entitled "IDENTIFICATION OF PEOPLE USING MULTIPLE TYPES OF INPUT" and published on Nov. 1, 2012); 2012/0327179 (entitled "AUTOMATIC VIDEO FRAMING" and published on Dec. 27, 2012); 2013/0044124 (entitled "CONTENT NORMALIZATION ON DIGITAL DISPLAYS" and published on Feb. 21, 2013); 2013/0093831 (entitled "Satellite Microphones for Improved Speaker Detection and Zoom" and published on Apr. 18, 2013); 2013/0147975 (entitled "CAPTURE DEVICE MOVEMENT COMPENSATION FOR SPEAKER INDEXING" and published on Jun. 13, 2013); 2013/0250039 (entitled "WIDE-ANGLE DEPTH IMAGING LENS CONSTRUCTION" and published on Sep. 26, 2013); 2014/0185814 (entitled "BOUNDARY BINAURAL MICROPHONE ARRAY" and published on Jul. 3, 2014); 2014/0198172 (entitled "TWO-WAY VIDEO CONFERENCING SYSTEM" and published on Jul. 17, 2014); 2014/0320592 (entitled "Virtual Video Camera" and published on Oct. 30, 2014); 2017/0085790 (entitled "HIGH-RESOLUTION IMAGING OF REGIONS OF INTEREST" and published on Mar. 23, 2017); 2017/0111595 (entitled "METHODS AND APPARATUSES FOR CONTROLLING VIDEO CONTENT DISPLAYED TO A VIEWER" and published on Apr. 20, 2017); 2017/0201825 (entitled "ACTIVE SPEAKER LOCATION DETECTION" and published on Jul. 13, 2017); 2018/0217804 (entitled "RESPONSIVE SPATIAL AUDIO CLOUD" and published on Aug. 2, 2018); and 2018/0364027 (entitled "Data Capture System for Texture and Geometry Acquisition" and published on Dec. 20, 2018), each of which is incorporated by reference herein in their entireties.

While various implementations have been described, the description is intended to be exemplary, rather than limiting, and it is understood that many more implementations and implementations are possible that are within the scope of the implementations. Although many possible combinations of features are shown in the accompanying figures and discussed in this detailed description, many other combinations of the disclosed features are possible. Any feature of any implementation may be used in combination with or substituted for any other feature or element in any other implementation unless specifically restricted. Therefore, it will be understood that any of the features shown and/or discussed in the present disclosure may be implemented together in any suitable combination. Accordingly, the implementations are not to be restricted except in light of the attached claims and their equivalents. Also, various modifications and changes may be made within the scope of the attached claims.

While the foregoing has described what are considered to be the best mode and/or other examples, it is understood that various modifications may be made therein and that the subject matter disclosed herein may be implemented in various forms and examples, and that the teachings may be applied in numerous applications, only some of which have been described herein. It is intended by the following claims to claim any and all applications, modifications and variations that fall within the true scope of the present teachings.

Unless otherwise stated, all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

Except as stated immediately above, nothing that has been stated or illustrated is intended or should be interpreted to cause a dedication of any component, step, feature, object, benefit, advantage, or equivalent to the public, regardless of whether it is or is not recited in the claims.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "a" or "an" does not, without further constraints, preclude the existence of additional identical elements in the process, method, article, or apparatus that comprises the element.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various examples for the purpose of streamlining the disclosure. This method of disclosure is not to be interpreted as reflecting an intention that the claims require more features than are expressly recited in each claim. Rather, as the following claims reflect, inventive subject matter lies in less than all features of a single disclosed example. Thus the following claims are hereby incorporated into the Detailed Description, with each claim standing on its own as a separately claimed subject matter.

What is claimed is:

1. A camera system comprising:
an enclosure;
a first imaging sensor having a first imaging surface with a first diagonal length in a first direction between two opposing corners of the first imaging surface;
a first lens arranged to guide a first image formation light flux toward the first imaging surface, wherein a first width of the first image formation light flux at the first imaging surface is equal to or greater than the first diagonal length of the first imaging sensor in the first direction of the first diagonal length;
a second imaging sensor, different than the first imaging sensor, having a second imaging surface with a second diagonal length in a second direction between two opposing corners of the second imaging surface; and
a second lens arranged to guide a second image formation light flux toward the second imaging surface, wherein a second width of the second image formation light flux at the second imaging surface, is equal to or greater than the second diagonal length of the second imaging sensor in the second direction of the second diagonal length, wherein:
the first imaging sensor, the first lens, the second imaging sensor, and the second lens are each mounted at least partially within the enclosure,
the first lens and the second lens are oriented in opposing directions,
the first lens includes a front lens group arranged to receive light from a scene,
the front lens group has a first optical axis, and
an upper extent of a first vertical field of view of the front lens group is at a greater angle from the first optical axis than a lower extent of the first vertical field of view of the front lens group.

2. The camera system of claim 1, wherein:
the first lens is arranged to provide a first horizontal field of view greater than 180 degrees to the first imaging surface;
the second lens is arranged to provide a second horizontal field of view greater than 180 degrees to the second imaging surface; and
the first horizontal field of view and the second horizontal field of view overlap and have a combined third horizontal field of view of 360 degrees.

3. The camera system of claim 2, wherein:
the first lens is arranged to provide the first vertical field of view less than or equal to 90 degrees to the first imaging surface; and
the second lens is arranged to provide a second vertical field of view less than or equal to 90 degrees to the second imaging surface.

4. The camera system of claim 3, wherein the first lens is an anamorphic lens having a higher focal length in a vertical direction than a horizontal direction.

5. The camera system of claim 3, wherein:
the first imaging surface is perpendicular to a chief ray of the first lens.

6. The camera system of claim 1, wherein the first imaging surface has an aspect ratio greater than 16:9 and the second imaging surface has an aspect ratio greater than 16:9.

7. The camera system of claim 1, wherein:
the first lens includes the first front lens group arranged to receive light from the scene;
the second lens includes a second front lens group arranged to receive light from the scene; and
the first front lens group and the second front lens group are coaxial.

8. The camera system of claim 1, further comprising:
a first reflector arranged to reflect light passing through the first lens; and
a second reflector arranged to reflect light passing through the second lens.

9. The camera system of claim 1, further comprising:
a mechanical sensor shifter configured to selectively shift both a first position of the first imaging sensor relative to the first lens in a third direction and a second position of the second imaging sensor relative to the second lens in the third direction.

10. The camera system of claim 9, wherein a range of shifting using the mechanical sensor shifter includes a plus or minus 10 degree shift in vertical field of views for both the first imaging surface and the second imaging surface.

11. The camera system of claim 9, wherein a shifting can be performed dynamically via a manual or electromechanical operation.

12. The camera system of claim 9, wherein:
the first lens includes the front lens group arranged to receive light from the scene and having an optical axis parallel to the third direction; and
the camera system includes a first reflector arranged to reflect light received from the front lens group toward the first imaging surface.

13. The camera system of claim 9, wherein:
the first lens includes the front lens group arranged to receive light from the scene and having an optical axis perpendicular to the third direction; and
the camera system includes a first reflector arranged to reflect the light received from the front lens group toward the first imaging surface.

14. The camera system of claim 9, wherein the mechanical sensor shifter is configured to shift the first position of the first imaging sensor together with the second position of the second imaging sensor to equally change a first angle of a first effective optical axis of the first imaging sensor and a second angle of a second effective optical axis of the second imaging sensor.

15. The camera system of claim 1, further comprising an image capture controller configured to synchronize capture of image frames by the first imaging sensor and the second imaging sensor.

16. The camera system of claim 1, further comprising an image processor configured to:
receive first image data for a first image frame captured by the first imaging sensor at a first time;
receive second image data for a second image frame captured by the second imaging sensor at approximately the first time; and
generate composite image data for a composite image frame having a 360 degree horizontal field of view based on the first image data for the first image frame and the second image data for the second image frame.

17. A camera system comprising:
an enclosure;
a first imaging sensor having a first imaging surface with a first diagonal length in a first direction between two opposing corners of the first imaging surface;
a first lens arranged to guide a first image formation light flux toward the first imaging surface, wherein a first width of the first image formation light flux at the first imaging surface is equal to or greater than the first diagonal length of the first imaging sensor in the first direction of the first diagonal length;
a second imaging sensor, different than the first imaging sensor, having a second imaging surface with a second diagonal length in a second direction between two opposing corners of the second imaging surface;
a second lens arranged to guide a second image formation light flux toward the second imaging surface, wherein a second width of the second image formation light flux at the second imaging surface, is equal to or greater than the second diagonal length of the second imaging sensor in the second direction of the second diagonal length;
a first reflector arranged to reflect light passing through the first lens; and
a second reflector arranged to reflect light passing through the second lens, wherein:
the first imaging sensor, the first lens, the second imaging sensor, and the second lens are each mounted at least partially within the enclosure,
the first lens and the second lens are oriented in opposing directions,
the first lens has a first entrance pupil for an incoming ray at 90 degrees from a first optical axis of the first lens;
the second lens has a second entrance pupil for an incoming ray at 90 degrees from a second optical axis of the second lens; and
a distance between the first entrance pupil and the second entrance pupil is less than or equal to 25 millimeters.

18. An integrated camera system comprising:
a first camera system according to the camera system of claim 1;
a base;
a riser extending upward from the base and supporting the first camera system; and
a speaker included in the base.

19. A camera system comprising:
an enclosure;
a first imaging sensor having a first imaging surface with a first diagonal length in a first direction between two opposing corners of the first imaging surface;
a first lens arranged to guide a first image formation light flux toward the first imaging surface, wherein a first width of the first image formation light flux at the first imaging surface is equal to or greater than the first diagonal length of the first imaging sensor in the first direction of the first diagonal length;
a second imaging sensor, different than the first imaging sensor, having a second imaging surface with a second diagonal length in a second direction between two opposing corners of the second imaging surface;
a second lens arranged to guide a second image formation light flux toward the second imaging surface, wherein a second width of the second image formation light flux at the second imaging surface, is equal to or greater than the second diagonal length of the second imaging sensor in the second direction of the second diagonal length;
a first reflector arranged to reflect light passing through the first lens;
a second reflector arranged to reflect light passing through the second lens, and
an image processor configured to:
receive first image data for a first image frame captured by the first imaging sensor at a first time;
receive second image data for a second image frame captured by the second imaging sensor at approximately the first time; and
generate composite image data for a composite image frame having a 360 degree horizontal field of view based on the first image data for the first image frame and the second image data for the second image frame, wherein:
the first imaging sensor, the first lens, the second imaging sensor, and the second lens are each mounted at least partially within the enclosure,
the first lens and the second lens are oriented in opposing directions,
the generation of the composite image data includes:
obtaining a current temperature of the camera system;
obtaining temperature-based image remapping parameters corresponding to the current temperature; and
remapping the first image data for the first image frame and the second image data for the second image frame based on the obtained temperature-based image remapping parameters.

20. A method of obtaining a 360-degree composite image frame, the method comprising:
receiving first image data for a first image frame captured by a first imaging sensor having a first imaging surface with a first diagonal length in a first direction between two opposing corners of the first imaging surface, wherein a first lens is arranged to guide a first image formation light flux toward the first imaging surface, wherein a first width of the first image formation light flux, at the first imaging surface is equal to or greater than the first diagonal length of the first imaging sensor in the first direction of the first diagonal length;
receiving second image data for a second image frame captured by a second imaging sensor, different than the first imaging sensor, having a second imaging surface with a second diagonal length in a second direction between two opposing corners of the second imaging surface, wherein a second lens is arranged to guide a second image formation light flux toward the second imaging surface, wherein a second width of the second image formation light flux, at the second imaging surface is equal to or greater than the second diagonal length of the second imaging sensor in the second direction of the second diagonal length; and
generating the 360-degree composite image frame based on the first image data for the first image frame and the second image data for the second image frame,
wherein:
the first imaging sensor, the first lens, the second imaging sensor, and the second lens are each mounted at least partially within an enclosure,
the first lens and the second lens are oriented in opposing directions,
the 360-degree composite image frame has a 360 degree horizontal field of view,
the first lens includes a front lens group arranged to receive light from a scene,
the front lens group has a first optical axis, and
an upper extent of a first vertical field of view of the front lens group is at a greater angle from the first optical axis than a lower extent of the first vertical field of view of the front lens group.

* * * * *